United States Patent [19]
Nagate et al.

[11] Patent Number: 5,703,449
[45] Date of Patent: Dec. 30, 1997

[54] CONTROLLER FOR BRUSHLESS DC MOTOR WITHOUT POSITION SENSOR

[75] Inventors: Takashi Nagate; Akihito Uetake; Yoshikazu Koike; Kunio Tabata, all of Suwa, Japan

[73] Assignee: Seiko Epson Corporation, Tokyo, Japan

[21] Appl. No.: 615,073

[22] Filed: Mar. 14, 1996

Related U.S. Application Data

[60] Continuation of Ser. No. 330,997, Oct. 28, 1994, abandoned, which is a division of Ser. No. 39,125, Apr. 15, 1993.

[30] Foreign Application Priority Data

| Oct. 19, 1990 | [JP] | Japan | 2-281536 |
| Nov. 17, 1990 | [JP] | Japan | 2-312305 |
| Nov. 17, 1990 | [JP] | Japan | 2-312306 |
| Nov. 20, 1990 | [JP] | Japan | 2-315451 |
| Nov. 20, 1990 | [JP] | Japan | 2-315452 |
| Nov. 20, 1990 | [JP] | Japan | 2-315469 |
| Jun. 21, 1991 | [JP] | Japan | 3-150144 |

[51] Int. Cl.$^6$ .................................................. H02P 5/00
[52] U.S. Cl. ............................................. 318/254; 318/439
[58] Field of Search ................................. 318/254, 439, 318/138

[56] References Cited

U.S. PATENT DOCUMENTS

| 3,949,283 | 4/1976 | Okuyama et al. | 318/138 |
| 4,617,675 | 10/1986 | Ashikaga et al. | 363/41 X |
| 4,638,223 | 1/1987 | Tajima et al. | 318/254 |
| 4,641,066 | 2/1987 | Nagata et al. | 318/254 |
| 4,673,849 | 6/1987 | Sears et al. | 318/138 X |
| 4,678,973 | 7/1987 | Elliott et al. | 318/254 |
| 4,700,116 | 10/1987 | Inoue et al. | 318/254 |
| 4,743,815 | 5/1988 | Gee et al. | 318/254 |
| 4,814,676 | 3/1989 | Van Hout | 318/254 |
| 4,874,993 | 10/1989 | Tanaka et al. | 318/254 |
| 4,928,043 | 5/1990 | Plunkett | 318/254 |
| 4,988,939 | 1/1991 | Reichard et al. | 318/800 |
| 5,001,405 | 3/1991 | Cassat | 318/254 |
| 5,017,845 | 5/1991 | Carobolante et al. | 318/138 |
| 5,233,275 | 8/1993 | Danino | 318/254 |
| 5,345,156 | 9/1994 | Moreira | 318/254 |

*Primary Examiner*—Jonathan Wysocki
*Attorney, Agent, or Firm*—Kanesaka & Takeuchi

[57] ABSTRACT

A controller according to one embodiment restarts the motor when a commutation timing signal is mismatched with an output pattern mode. A controller according to another embodiment compares the motor speed with the reference signal to change the chopper frequency in accordance with the compared value. A controller according to still another embodiment continuously changes the chopper frequency in accordance with the motor speed. A controller according to yet another embodiment inhibits the position detection immediately after commutation in accordance with the current flowing through the motor. A controller according to another embodiment detects the position of the rotor in accordance with the waveform of the current flowing through the motor.

2 Claims, 29 Drawing Sheets

FIG.6

| output pattern mode | 5 | 4 | 3 | 2 | 1 | 0 |
|---|---|---|---|---|---|---|
| excitation pattern | W⟵U→V | U↙W  V | U  W↘V | U↖W  V | U  W⟵V | U  W→V |
| commutation timing detection phases | U+ | W− | V+ | U− | W+ | V− |
| turned-on diodes | $Da^+$ | $Dc^-$ | $Db^+$ | $Da^-$ | $Dc^+$ | $Db^-$ |

… 1

CONTROLLER FOR BRUSHLESS DC MOTOR WITHOUT POSITION SENSOR

CROSS-REFERENCE TO RELATED APPLICATION

This is a continuation application of Ser. No. 330,997 filed Oct. 28, 1994, now abandoned, which is a divisional application of Ser. No. of 039,125 filed Apr. 15, 1993.

TECHNICAL FIELD

The present invention relates to a brushless DC motor without position sensor utilizing a counter electromotive force generated in coils wound on a stator as a rotor is rotated to position-detect magnetic poles of the rotor, and more particularly to a brushless DC motor without position sensor having the rotor configured so that respective rotating magnetic pole surfaces of the rotor come most closely adjacent to inner end surfaces of the stator's respective magnetic poles at predetermined circumferential points on the respective rotating magnetic pole surfaces and thereby positions of the rotor's respective poles. The present invention further relates to various controllers serving for drive control of such a brushless DC motor without position sensor.

PRIOR ART

Recently the brushless DC motor has been used in various apparatus and equipment in view of its high efficiency and controllability. The brushless DC motor has the substantially same construction as the synchronous motor, so the position detector such as the Hall element has been necessary to detect a position of the rotor in driving. However, the space occupied by such a position detector has become a serious problem with the progress of miniaturization and has come to the front as an important factor which obstructs a desired miniaturization of the motor. To solve such a problem, so-called position-sensorless, brushless DC motor has been developed recently and already been put in practical use.

FIG. 26 is a fragmentary sectional view showing a conventional brushless DC motor without position sensor in an enlarged scale. Such a position-sensorless, brushless DC motor 81 of prior art comprises a stator 82 and a rotor 83. The stator 82 surrounds the rotor 83 rotatably supported by a rotatable shaft 86 and includes a plurality of stationary magnetic poles 84 projecting inward. The respective stationary magnetic poles 84 carry coils U, V, W (not shown) wound thereon. The stationary magnetic poles 84 are magnetized in a predetermined polarity as current flows through the coils U, V, W. Stationary magnetic pole surfaces 85 defined by the inner end surface of the respective stationary magnetic poles 84 lie at equal distances from the center of the rotatable shaft 86 along a cylindrical surface.

The rotor 83, on the other hand, comprises a yoke 87 formed from a plurality of silicon steel sheets laminated integrally and a pair of field permanent magnets 88. The yoke 87 is provided along its outer periphery with four rotating magnetic poles 89 projecting outward and these rotating magnetic poles 89 are alternately provided in their bases with the field permanent magnets 88 inserted therein with the N-poles of these magnets 88 being arranged face to face. Respective rotating magnetic pole surfaces 90 defined by the outer end surfaces of the respective rotating magnetic poles 89 lie at equal distances from the center of the rotatable shaft 86 so as to form curved surfaces, respectively, so that each rotating magnetic pole surface 90 is uniformly spaced from the confronting stationary magnetic pole surface 85 at every point on the rotating magnetic pole surface 90.

Under the effect of mutual repulsion occurring between the N-poles of the two permanent magnets 88, the magnetic flux generated by the rotor 83 exits from the yoke 87 via the rotating magnetic poles containing therein no field permanent magnet and enters again into the yoke 87 via the rotating magnetic poles containing therein the respective field permanent magnets as shown. Consequently the rotating magnetic poles containing therein the respective permanent magnets are magnetized in S-polarity and the rotating magnetic poles containing therein no permanent magnets are magnetized in N-polarity.

Recently a driving method for the position-sensorless, brushless DC motor has been proposed, in which the counter electromotive force generated in the stator coils as the rotor rotates is utilized instead of relying on the position detector (Suzuki, Ogasawara, Akagi, Nabae, Nagatake, Okuyama: "A Brushless DC Motor without Position Sensors," National Convention IEE Japan Industry Application Society No. 34, 1988). With such a driving method, as shown in FIG. 27, a 120 electrical-degree voltage type inverter 91 is used as the main circuit and RPM control is effected by a chopper control. Referring to FIG. 27, reference numeral 81 designates a motor, reference numeral 82 designates a stator, reference numeral 83 designates a rotor, symbols U, V, W designate stator coils of respective phases, symbols $Ta^+$, $Tb^+$, $Tc^+$, $Ta^-$, $Tb^-$, $Tc^-$ designate transistors, and symbols $Da^+$, $Db^+$, $Dc^+Da^-$, $Db^-$, $Dc^-$ designate feedback or 35 free wheel diodes. According to this proposal, the counter electromotive forces $e_a$, $e_b$, $e_c$, generated in the respective phases and the drive signal applied to a pair of transistors are trially obtained in the mutual relationship as illustrated in FIG. 28. The respective phases U, V, W have their open periods (i.e., a period for which the transistors are free from application of the drive signal) twice each for 60° during a period corresponding to an electrical angle of 360°. It should be understood here that the phase in the open state is referred to hereinafter as the open phase.

To drive the motor according to this driving method, a starting sequence as shown in FIG. 29 is followed. Initially, the motor is excited for a predetermined time with the drive signal of an optional excitation pattern (step T31) and thereby the rotor is displaced to the position corresponding to this excitation pattern (step T32). Then, the excitation pattern is changed over to the excitation pattern advanced by 120° (step T33) and thereby the motor is rotated (step T34). The counter electromotive force is generated in the stator coils as the motor is rotated. The rotating magnetic poles are indirectly position-detected by detecting the turned-on state of the feedback diodes associated with the open phases and thus the commutation signal is generated (step T35). More specifically, rotation of the rotor causes the stator coils to generate the counter electromotive force which causes, in turn, the terminal voltage of each open phase to be varied. Consequently, anode potential of the P-side feedback diodes rises to a level higher than $Ed^+$ or cathode potential of the N-side feedback diodes drops to a level lower than $Ed^-$ and thus the feedback diodes are tuned on. Accordingly, the turned-on state of the diodes associated with the open phases may be detected to detect the current excitation pattern and, in consequence, positions of the rotating magnetic poles are detected. Practically, the mode detector 92 as shown in FIG. 27 detects the turned-on state of the respective diodes by comparing the reference voltage Ed with the terminal voltage of each diode.

The turned-on states of the diodes associated with the open phases are detected in the proximity of 30° during the open period of 60°. Namely, the turned-on state is detected at a leading phase of approximately 30°. Accordingly, the control circuit 93 generates the drive signal with delaying all the phases approximately 30°, respectively (such phase delaying is referred to as phase shift), to effect the next commutation and utilizes this drive signal to perform the chopper control.

In the conventional position-sensorless, brushless DC motor having the yoke containing the permanent magnets inserted therein, the field permanent magnets usually have substantially rectangular cross-sections, respectively and the outer magnetic pole surface of each field permanent magnet defines a relatively large surface. Such configuration also has contributed to the above-mentioned deviation of the magnetic flux.

The conventional rotor comprising the yoke and the field permanent magnets has encountered another problem concerning a strength of the yoke. More specifically the field permanent magnets each having a rectangular cross-section which is slightly narrower than the associated rotating magnetic pole is inserted into the base of this rotating magnetic pole and, therefore, bridges of the yoke which connect the outer end to the base of each rotating magnetic pole containing therein the field permanent magnet have necessarily slender configuration.

With the driving method of prior art, if the counter electromotive force can be detected at first one commutation based on the starting sequence, it will be determined that a normal starting has been achieved and a change-over will occur from the open loop to the sensorless running. Therefore, the rotor is inadequately position-held and vibrates, for example, when a load involves a torque fluctuation. Moreover, if next one commutation is performed under a torque being generated in the reverse direction the rotor is rotated from a position other than the desired position, so the counter electromotive force is detected prematurely by an electrical angle of 60° or 120° with respect to the actual position of the rotor and change-over to the sensorless running occurs, upon which a predetermined excitation pattern is output. However, the motor can not be normally started and often vibrates since this excitation pattern differs from the intrinsic excitation pattern depending on the actual position of the rotor. Even if the motor is vibrating, a signal representing the counter electromotive force is detected and, if this signal is higher than a level required for the sensorless running, the predetermined excitation pattern continues to be output. Consequently, both the normal starting and the restarting are impossible.

With the above-mentioned driving method, furthermore, the chopper frequency has had to be set, for a relatively wide rotation frequency range of the motor, so that the commutation timing be free from any affection of the detection timing delay at the maximum rotation frequency. For example, an electrical angle of 60° corresponds to 0.5 m/sec and, therefore, the chopper frequency is set to a level as high as in order of 10 kHz. However, such high chopper frequency disadvantageously results in an increased switching loss of the inverter and a significant heat generation from the inverter elements.

In addition, the above-mentioned driving method has encountered further another problem that the electric energy accumulated in the stator coils is emitted immediately after transfer from the energized state to the deenergized state and consequently a voltage appears in the open phase. The time period for which the electric energy is emitted depends on the value of current flowing through the stator coils and the load exerted on the motor. The motor is not rotated during emission of such electric energy, because no precise position information of the permanent magnet rotor can be obtained unless the detection of the counter electromotive force is inhibited.

Finally; the above-mentioned driving method is accompanied with further additional problem concerning the detection of the relative position of the stator coils and the permanent magnet rotor. More specifically, the counter electromotive force appearing in the stator coils being not fed (hereinafter referred to as open phases) is detected and thereby the relative position of the stator coils and the permanent magnets is detected according to the driving method. However, if the counter electromotive force appearing in the open phases nonlinearly varies, no precise detection of the relative position will be achieved.

Accordingly, it is an object of the invention to provide a controller adapted, even when the motor can not be normally rotated, for example, due to a vibration in starting, return to the start of an open loop so an open loop control can be restarted to repeat the position fixation of the rotor until the normal rotation is achieved.

It is also an object of the invention to provide a controller adapted to change over the chopper frequency continuously depending on the rotation frequency of the motor and thereby to minimize a switching loss of the inverter.

It is also an object of the invention to provide a controller adapted to be able to detect the counter electromotive force precisely even if the rotation frequency and/or load of the motor fluctuate.

It is also an object of the invention to provide a control system adapted to detect the waveforms of current flowing through the brushless DC motor and thereby to achieve a stable position detection of the permanent magnet rotor even if the counter electromotive force appearing in the open phases nonlinearly varies.

DISCLOSURE OF THE INVENTION

To achieve the objects set forth above, the first aspect of the invention resides in a controller for the brushless DC motor without position sensor utilizing turned-on states of feedback diodes, the control system comprising an output pattern mode generator, a commutation timing signal generator and a coincidence detector serving to detect a coincidence of the signals generated from the output pattern mode generator and the commutation timing signal generator, respectively, wherein, when the output of the detector indicates no coincidence, a motor drive output is stopped once and then starting is repeated.

The second aspect of the invention resides in a controller for the brushless DC motor without position sensor utilizing turned-on states of feedback diodes and provided with a chopper control adapted for rotation-frequency-adjustably driving the brushless DC motor, the controller comprising motor's rotation frequency detector means and comparator means serving to compare the output signal of the detector means with a reference signal depending on the rotation frequency of the motor, wherein a chopper frequency is changed based on the output signal of the comparator.

The third aspect of the invention resides in a controller for the brushless DC motor without position sensor utilizing turned-on states of feedback diodes and provided with a chopper control adapted for rotation-frequency-adjustably driving the brushless DC motor, the controller comprising a circuit adapted to generate the number of pulses proportional to the rotation frequency of the motor and an F/V converter adapted to generate voltage proportional to the number of pulses, wherein a chopper frequency is continuously changed based on the output of the F/V converter.

The fourth aspect of the invention resides in a controller for the brushless DC motor without position sensor, the controller comprising means serving to detect current flowing through the motor and means serving to inhibit detection of the counter electromotive force immediately after commutation.

The fifth aspect of the invention resides in a controller for the brushless DC motor without position sensor, the controller comprising means serving to detect the rotation frequency of the motor and means to inhibit detection of the counter electromotive force immediately after commutation.

The sixth aspect of the invention resides in a controller for the brushless DC motor without position sensor, the controller comprising means serving to detect waveforms of current flowing through the brushless DC motor and means serving to position-detect the permanent magnet rotor based on the waveforms of current.

BRIEF DESCRIPTION OF THE DRAWINGS

FIG. 6 is a diagram illustrating a mutual relationship of output pattern mode, excitation mode and commutation timing detection phase;

PREFERRED EMBODIMENTS OF THE INVENTION

Initially, the related embodiment will be described with reference to FIGS. 1 and 2.

Figure 1:
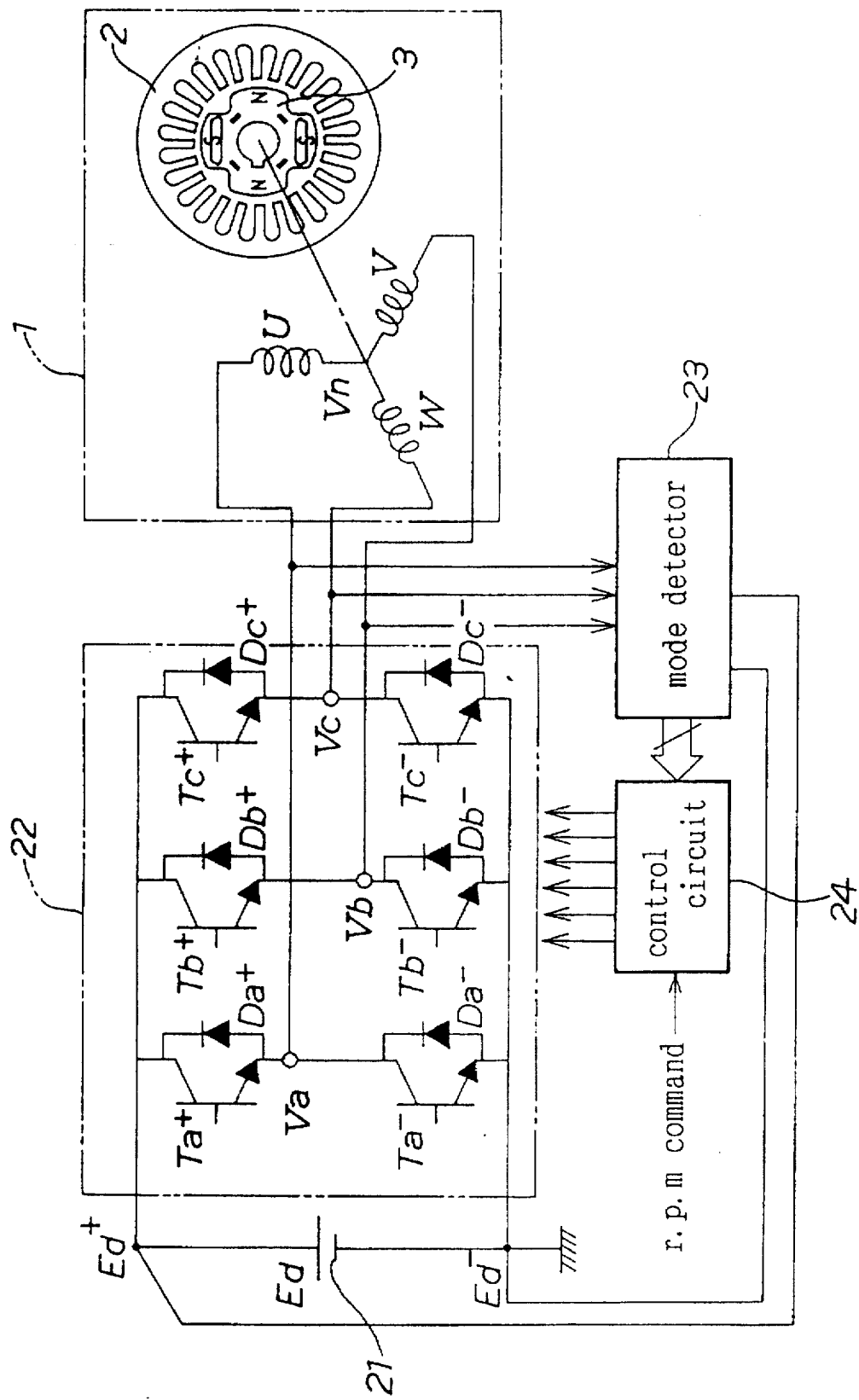
FIG. 1 is a circuit diagram showing circuit components of a brushless DC motor without position sensor such as an inverter in the related embodiment of the invention.
Figure 2:
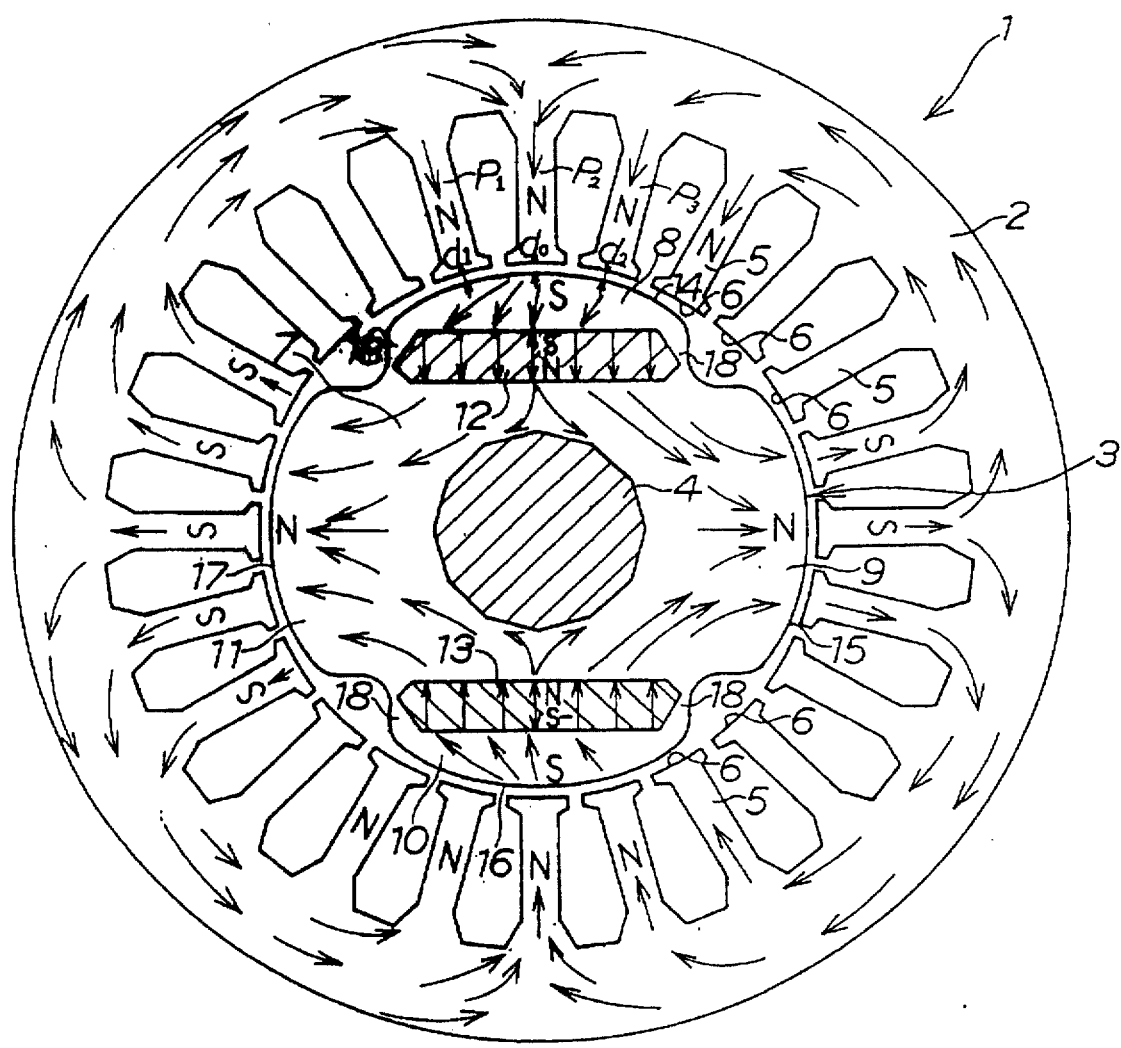
FIG. 2 is a sectional view of the brushless DC motor without position sensor taken transversely of an axis thereof.

Referring to FIG. 1, there is shown a general arrangement of a drive control system for the brushless DC motor without position sensor.

The drive control system for the brushless DC motor without position sensor, in addition to the brushless DC motor without position sensor 1 itself, a power supply 21, an inverter 22 having charge of chopper control, a mode detector 23 utilizing a counter electromotive force to detect the position of a rotor 3 and a control circuit 24 serving to control the inverter 22. The brushless DC motor without position sensor 1 comprises a stator 2 and the rotor 3. The brushless DC motor without position sensor 1 in this embodiment is of three-phase inverter driven type and reference symbols U, V, W designate respective coils wound on the stator 2. Reference symbol Vn designates voltage across U, V, W and this voltage is generated selectively across two of these three coils U, V, W upon switching of the inverter 22.

The power supply 21 is in a state ready to supply rectified current. Reference symbol Ed (and Ed$^+$, Ed$^-$) designates an electromotive force. The inverter 22 comprises feedback diodes Da$^+$, Db$^+$, Dc$^+$, Da$^-$, Db$^-$, Dc$^-$ and transistors Ta$^+$, Tb$^+$, Tc$^+$, Ta$^-$, Tb$^-$, Tc$^-$.

The respective system components operate, as will be described, in rotationally driving the brushless DC motor without position sensor.

The inverter 22 comprises P-side transistors Ta$^+$, Tb$^+$, Tc$^+$ to which the feedback diodes Da$^+$, Db$^+$, Dc$^+$ are connected, respectively, and N-side transistors Ta$^-$, Tb$^-$, Tc$^-$ to which the feedback diodes Da$^-$, Db$^-$, Dc$^-$ are connected, respectively. Under chopper control by a set of P-side transistor and N-side transistor, two of the three-phase coils are selectively supplied in succession with three-phase direct current to generate magnetic field by which the rotor is rotationally driven. More specifically, output mode patterns if the driving signal are preset to 5 through 0 in accordance with excitation patterns required to maintain normal rotation of the motor 1, as will be described later with reference to FIG. 6 and the motor 1 is rotationally driven under effect of commutation sequenced by a relationship between the respective excitation patterns, on one hand, and commutation timing detection phases and turned-on diodes, on the other hand. The mode detector 23 is connected to the inverter 22 and detects the turned-on states of the respective feedback diodes included by the inverter 22 based on the counter electromotive force generated in the respective coils of the motor 1. The control circuit 24 detects the commutation timing of the respective coils U, V, W based on the detection signal from the mode detector 23 and outputs the driving signal to each transistor of the inverter 22 so that a well timed commutation may occur to the respective coils U, V, W. The chopper control is effected in the inverter 22. Based on the driving signal, the inverter 22 repeats the operation as mentioned above. Such repeated operation causes the rotor 3 to be continuously driven.

The stator 2 and the rotor 3 of the brushless DC motor without position sensor constituting an important part of this embodiment will be described more in detail. FIG. 2 shows the brushless DC motor without position sensor of this embodiment in an enlarged sectional view taken transversely of the rotation axis thereof.

The stator 2 surrounds the rotor 3 and has twenty four stationary magnetic poles 5 projecting inward. Though not shown, these stationary magnetic poles 5 carry coils wound thereon. Stationary magnetic pole surfaces 6 defined by inner ends surfaces of the respective stationary magnetic poles 5 lie at equal distances from the center of a rotatable shaft 4 in conformity with an imaginary cylindrical surface.

The rotor 3 is rotatably supported by the rotatable shaft 4 and includes a yoke 7 comprising a plurality of integrally laminated silicon steel sheets. The yoke 7 has along its outer periphery four rotating magnetic poles 8, 9, 10, 11 projecting radially outward. A pair of field permanent magnets 12, 13 are inserted into bases of the rotating magnetic poles 8, 10, respectively, in parallel to the rotatable shaft 4 with N-poles of these field permanent magnets 12, 13 being positioned face to face. Consequently, the N-poles of the field permanent magnets 12, 13 repulse each other and magnetic flux generated therefrom defines a magnetic path as illustrated by FIG. 2. Specifically, the magnetic flux from the yoke 7 after having passed through the rotating magnetic poles 9, 11 and then enters the yoke again through the rotating magnetic poles 8, 10. Thus, the rotating magnetic poles 8, 10 are magnetized as S-poles while the rotating magnetic poles 9, 11 are magnetized as N-poles.

The rotating magnetic pole surfaces 14, 15, 16, 17 on the outer ends of the respective rotating magnetic poles 8, 9, 10, 11 define curved surfaces swelling radially outward, respectively. In the instant case, circularly curved surfaces defined by the respective rotating magnetic pole surfaces 14, 15, 16, 17 have a curvature larger than that of the imaginary cylindrical surface on which the stationary magnetic pole surfaces 6 lie. In other words, the rotating magnetic pole surfaces 14, 15, 16, 17 are most closely adjacent to the stationary magnetic pole surfaces 6 at circumferential middle points of the respective rotating magnetic pole surfaces.

The magnetic flux generated from the field permanent magnets 12, 13 is concentrated on the circumferentially middle points at which the rotating magnetic pole surfaces are most closely adjacent to the stationary magnetic pole surfaces. Such phenomenon will be explained more in detail in connection with the rotating magnetic pole surface 14.

A distance from the circumferentially middle point of the rotating magnetic pole surface 14 to the corresponding stationary magnetic pole P2 is designated here by do and distances from the stationary magnetic poles P1, P3 adjacent the stationary magnetic pole P2 to the rotating magnetic pole surface 14 are designated by d1 and d2, respectively. The distance do is smaller than both the distance d1 and the distance d2 and, in consequence, the magnetic flux generated from the field permanent magnet 12 reaches the rotating magnetic pole surface 14 mostly via the stationary magnetic pole P2 and thereby a counter electromotive force generated by the rotating magnetic pole surface 14 is concentrated to the stationary magnetic pole P2. This is true also for the other rotating magnetic pole surfaces 15, 16, 17.

In this way, the rotor 3 having the above-mentioned circularly curved rotating magnetic pole surfaces normally generates the counter electromotive force mostly from the circumferentially middle points of the respective rotating magnetic pole surface so that an erroneous position detection of the rotating magnetic poles may be reliably avoided.

As shown, the field permanent magnets 12, 13 in the instant case are configured to have opposite lateral sides slanted so that its S-pole side may have a surface area smaller than that of its N-pole side. Thus, the magnetic flux generated from the permanent magnets is concentrated at circumferentially middle points of their S-pole surfaces and accordingly at circumferentially middle points of the rotating magnetic pole surfaces 14, 16. Bridges 18 defined at the opposite lateral sides of the respective field permanent magnets 12, 13 have relatively large width over most of their extents, since the opposite lateral sides are slanted. With a consequence, the yoke 7 has a relatively high strength such that the yoke 7 might not easily deformed even when an unexpected external force is exerted on the rotating magnetic pole surfaces 14, 16.

Now, the first embodiment of the invention will be described with reference to FIGS. 3 through 7.

Figure 3:
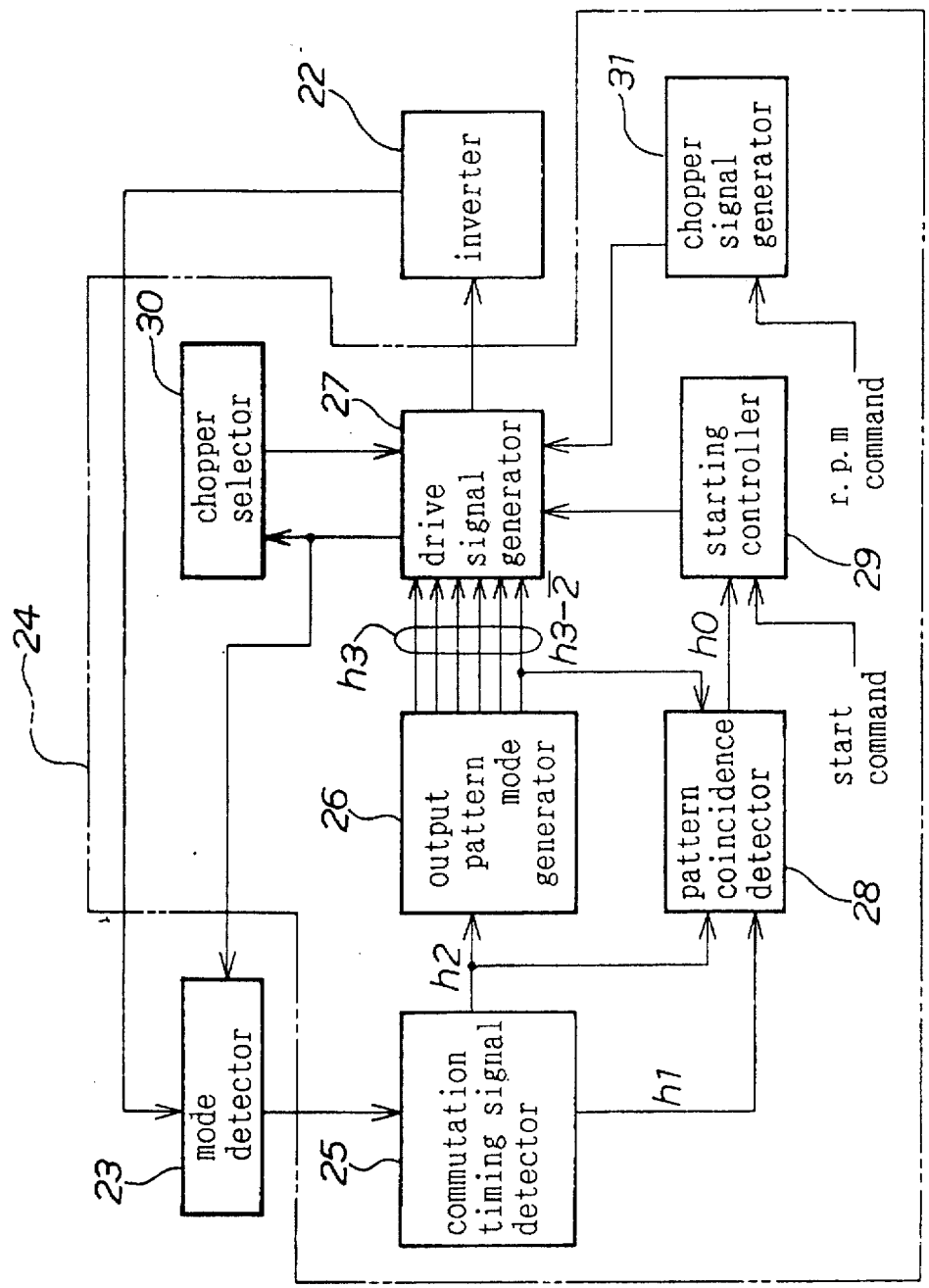
FIG. 3 is a block diagram of a control circuit in the first embodiment of the invention.

FIG. 3 is a block diagram of a control system constructed according to the invention. A mode detector 23 compares a reference voltage Ed (and Ed$^+$, Ed$^-$) for forward voltage drop of feedback diodes included by an inverter 22 with terminal voltage of the respective diodes in order to detect the turned-on states of the respective feedback diodes and thereby to detect the excitation pattern modes. In this embodiment, the inverter 22 is of three-phase bipolar type and, as shown in FIG. 6, detects the turned-on states of six phases U$^+$, U$^-$, V$^+$, V$^-$, W$^+$, W$^-$ corresponding to the respective excitation patterns and applies the corresponding detection signals to a control circuit 24 which, in turn, comprises a commutation timing signal detector 25, an output pattern mode generator 26, a drive signal generator 27, a pattern coincidence detector 28, a starting controller 29, a chopper selector 30 and a chopper signal generator 31. The commutation timing signal detector 25 is adapted to detect the commutation timing signal based on the output from the mode detector 23 and to generate a clock pulse. The output pattern mode generator 26 is adapted to generate, based on the clock pulse applied from the commutation timing signal detector 25, signals representing six modes as indicated in FIG. 6 and, based on each of these signals, the drive signal generator 27 generates a motor drive signal. The pattern coincidence detector 28 compares a signal h1, one of the six commutation timing signals with a waveform h3-2 of the output pattern mode 2 during a period for which the output pattern mode generator 26 outputs a signal ho to the starting controller to request a restarting. Based on a signal h3 from the output pattern mode generator 26 and a signal from the starting controller 29, the drive signal generator 27 generates a motor drive signal while the chopper selector 30 determines whether the chopper is positive or negative and outputs a corresponding signal to the drive signal generator 27. The signal coming from the chopper signal generator 31 is superposed in the drive signal generator 27 and thereby driving the respective transistors of the inverter 22.

Figure 4:
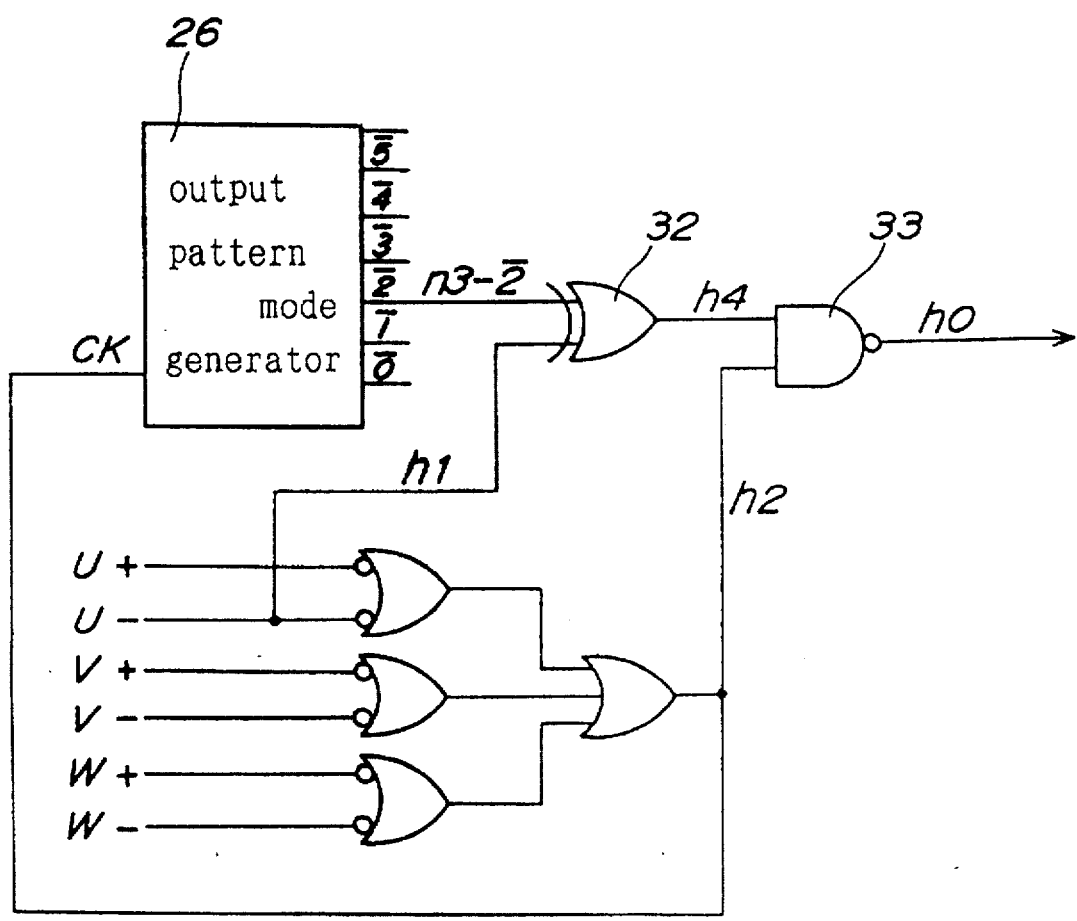
FIG. 4 is a circuit diagram showing an example of a pattern coincidence detector.

Referring to FIG. 4, the arrangement of the pattern coincidence detector 28 is illustrated. The output pattern mode generator 26 functions as a down-counter adapted to generate the OR signal h2 of the six commutation timing signals in the form of a clock pulse successively on six output terminals 5 through 0. In starting and restarting, the mode 5 is output as an initial mode, then the modes 3, 2, 1, 0 and 5 are output in this order (Regarding such sequence, details will be described later). The output h3-2 of the output pattern mode generator 26 and the commutation timing signal h1 are applied to EX-OR gate 32 of which the output h4, in turn, is applied together with the OR signal h2 of the six commutation timing signals to an NAND gate 33. Specifically, the output h3-2 of the output pattern mode generator 26 is compared with the commutation timing signal h1 during a period for which the OR signal h2 of the six commutation timing signals is output and, if no coincidence is detected, the output ho of the NAND gate 33 becomes High. This output is applied to the starting controller 29. Correlation of the respective signals is illustrated by a time chart of FIG. 5.

Figure 5:
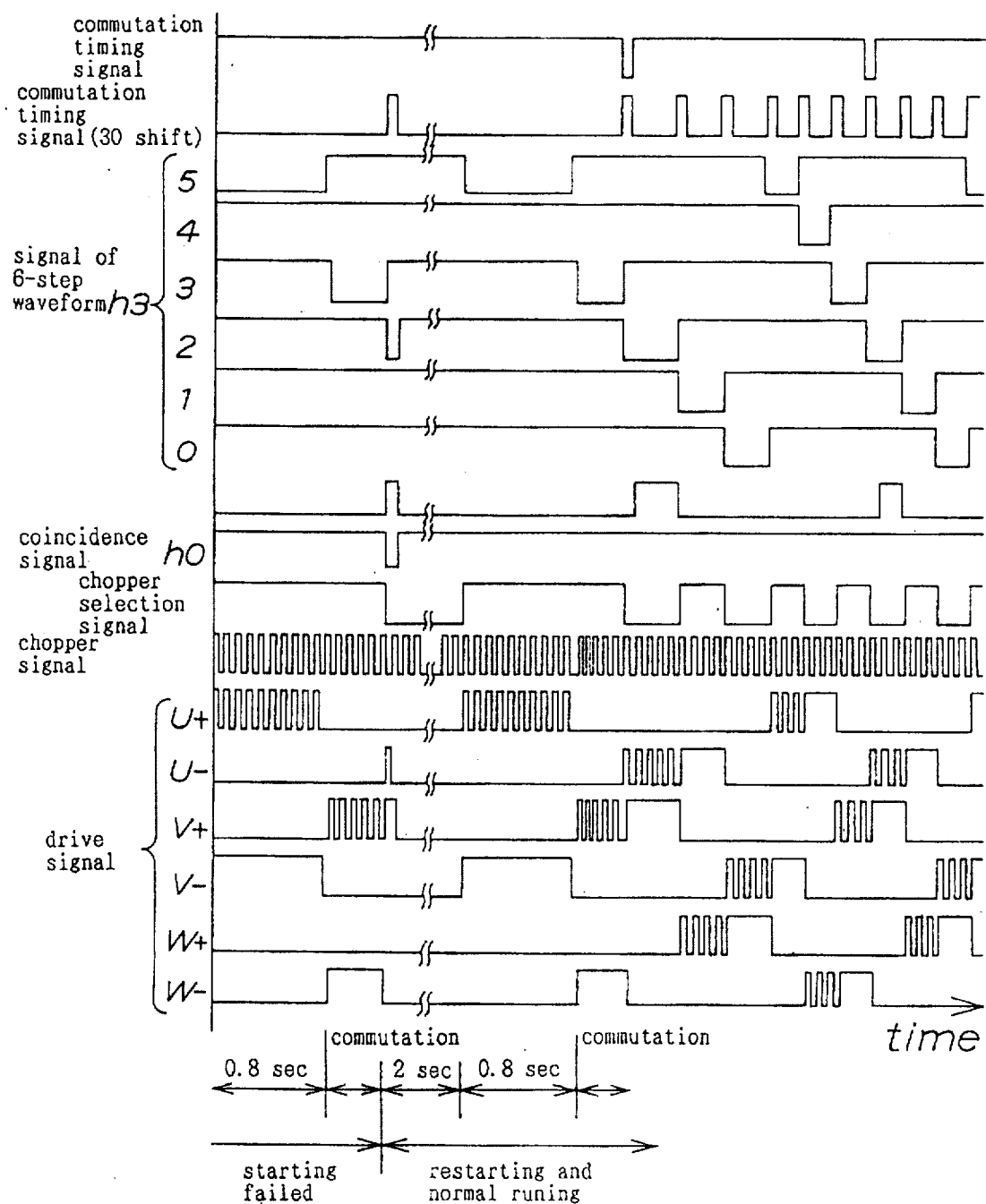
FIG. 5 is a timing chart illustrating a mutual relationship of various signals appearing in the control circuit.

The drive signal generator 27 successively generates the drive signals of the output patterns 5 through 0 corresponding to the excitation patterns as indicated in FIG. 6. More specifically, the output pattern modes, the excitation patterns and the commutation timing signal detection phases are mutually related one another as illustrated in FIG. 5. For example, if the commutation timing signal was detected from U⁻ of the open phase U at the output pattern mode 3, the excitation pattern may be changed over from that corresponding to the mode 3 to that corresponding to the mode 2 at the next output pattern mode 2, i.e., the excitation mode "from V⁺ to U⁻" in order to continue the normal rotation.

Figure 7:
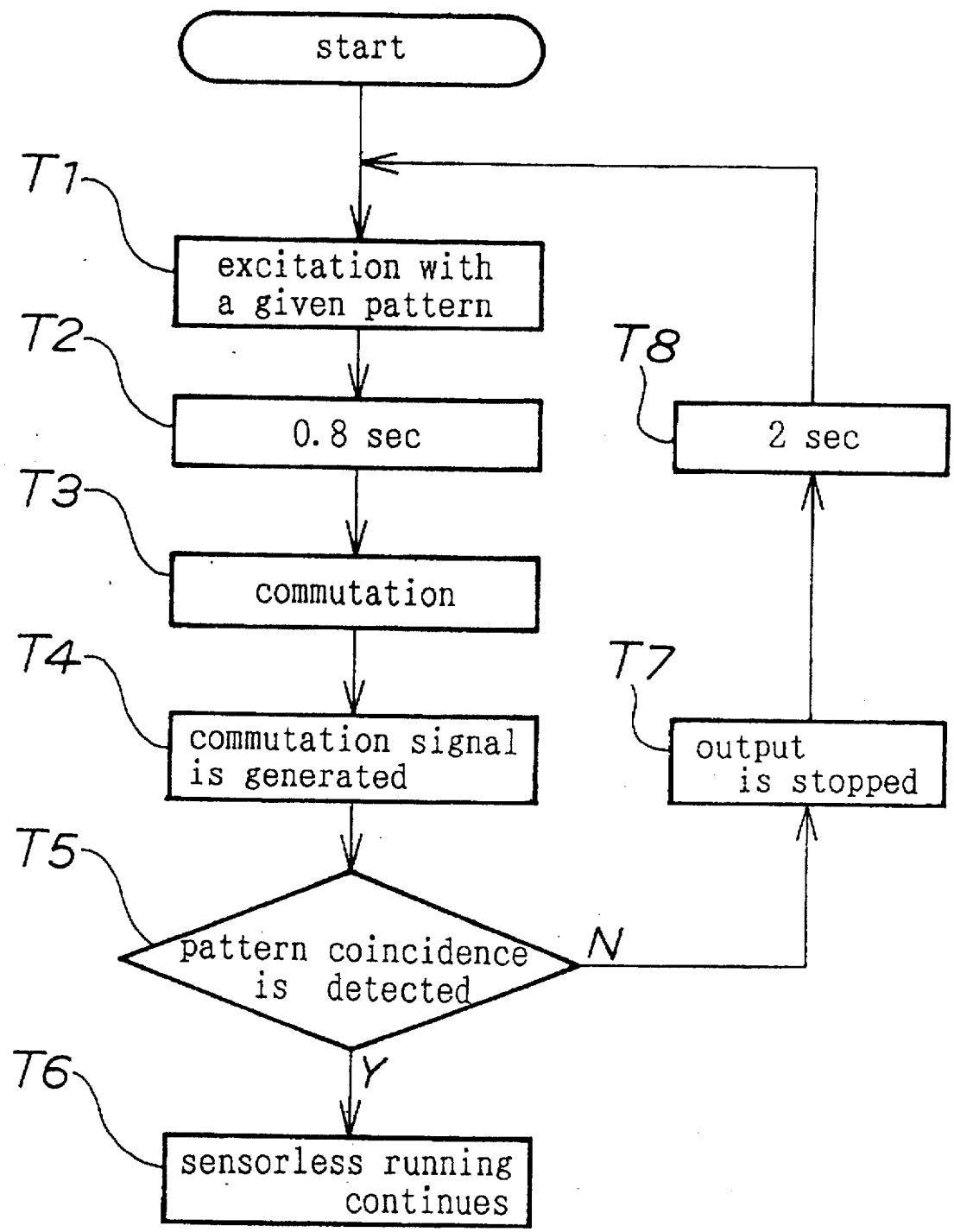
FIG. 7 is a flow chart of a starting sequence.

FIG. 7 is a flow chart illustrating a starting sequence in this embodiment. Excitation of a given pattern occurs at a step T1. In this instance, the mode 5 is selected as the given pattern, i.e., the excitation pattern of "U⁺ phase to V⁻ phase" and 10 to 15A is fed with such output pattern. Such state is maintained for 0.8 sec at a step T2. Consequently, the rotor is rotated in forward or reverse direction by an electrical angle of 180° max and stopped so that a position of the rotor may be fixed. Now, the output pattern mode is advanced by two and the mode 3 is output. Namely, feed occurs with the excitation pattern "from V⁺ phase to W⁻ phase". As a result, the rotor is started in forward direction according to the excitation pattern being advanced further by electrical angle 120° in forward direction and accelerated. A degree of acceleration depends on the feed current value as well as the loading condition and, in this embodiment, a revolution speed enough to generate the counter electromotive force required for sensorless running can be reached at a moment of starting with a feed current in order of 5A. Thus at a step T4, the commutation timing signal is generated. So far as the normal rotation is concerned, the commutation timing signal is detected from the feedback diodes of the U⁻ phase which is open during this period. Then, a step T5 determines whether the output pattern mode coincides with the commutation timing signal generation phase or not. More specifically, the step T5 determines whether the signal of the mode 2 coincides with the commutation timing signal from the U⁻ phase or not, since the output pattern mode is advanced by 1 to the mode 2 as the commutation timing signal is generated. If a coincidence is detected, the routine proceeds to a step T6 to continue the sensorless running, and if not detected, the routine is branched to a step T7 to stop the output pattern. After 2 sec has elapsed at a step T8, the routine returns to the step 1, the start point the open loop, to repeat the starting sequence. The elapsing time at the step T8 is preferably set to a time period at the end of which the rotor stops and, in this embodiment, the time in order of 2 sec is appropriate.

It should be understood that the current value, the elapsing time and the output pattern are specific for this embodiment and it is obviously possible to employ the other values and patterns in the other embodiments.

As will be apparent from the foregoing description, the first embodiment of the invention is arranged so that the state in which the motor is rotating can be detected even under a load possibly causing the state during the starting to fluctuate and restarting can be tried by repeating the starting sequence even when the motor is vibrating. In this way, a further reliable starting can be achieved with a relatively simple circuit arrangement.

The second embodiment of the invention will be described with reference to FIG. 8.

Figure 8:
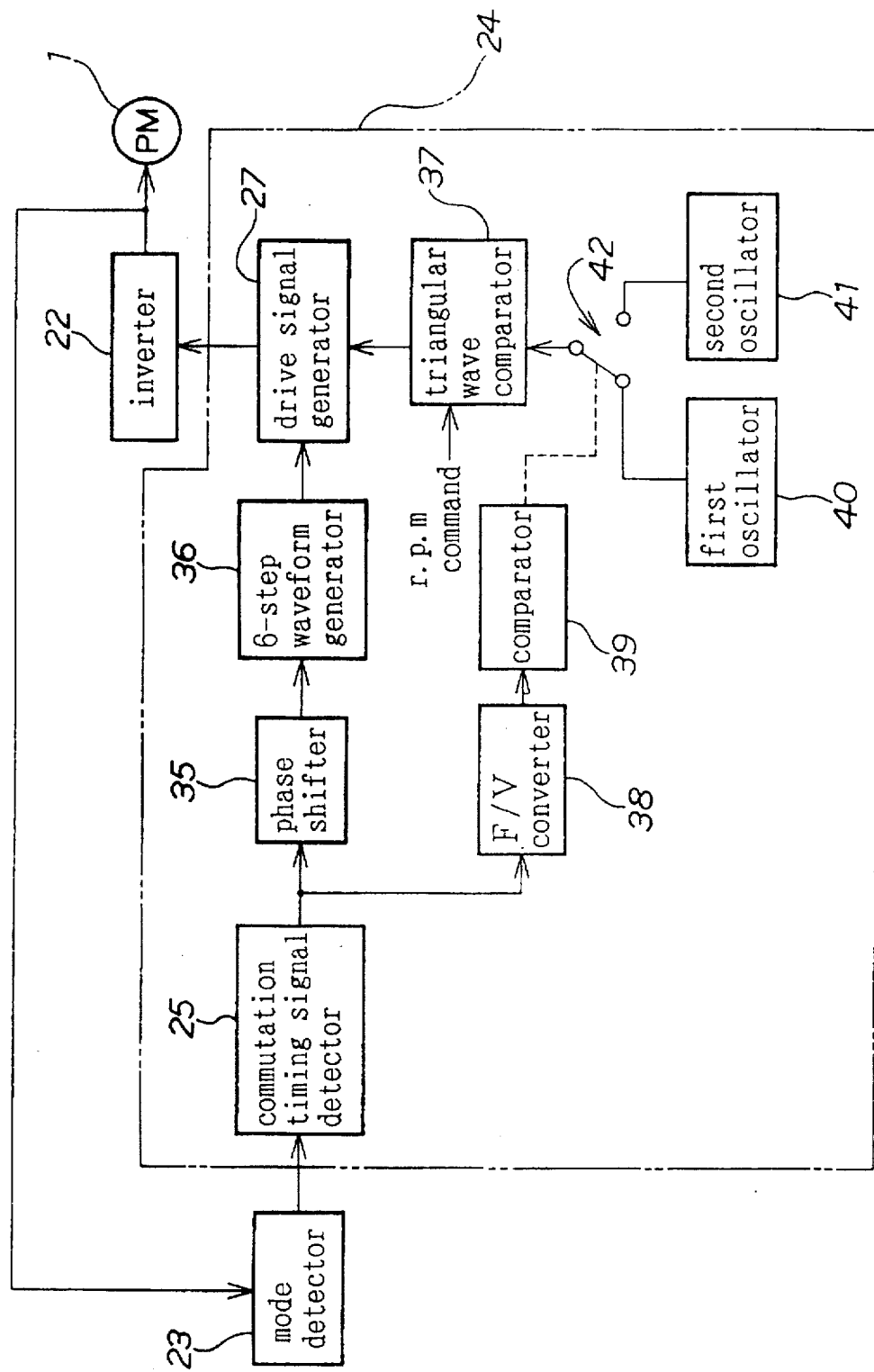
FIG. 8 is a block diagram of the control circuit in the second embodiment of the invention.

FIG. 8 is a block diagram showing an arrangement of a controller. As has previously been mentioned, a mode detector 23 detects the turned-on state of respective feedback diodes. A control circuit 24 in this embodiment principally comprises a commutation timing signal detector 25, a phase shifter 35, a 6-step waveform generator 36, a drive signal generator 27, a triangular wave comparator 37, an F/V converter 38, a comparator 39 and first and second oscillators 40, 41.

The commutation timing signal detector 25 detects the commutation timing obtained from a chop-off period based on the output of the mode detector 23 and generates a clock pulse. The phase shifter 35 is a delay circuit comprising a counter adapted to obtain a normal commutation timing based on the output signal of the commutation timing signal detector 25 and shifts (i.e., delays) the phase generally within an electrical angle of 15° to 30°. The 6-step waveform generator 36 generates waveforms of six modes based on the clock pulses applied from the phase shifter 35 so that the drive signal detector 27 may generate thereupon the motor drive signal and superpose this on the chopper signal applied from the triangular wave comparator 37 prior to application to the inverter 22. The F/V converter 38 serves to F/V convert the clock pulses which are proportional to the rotation frequency of the motor 1 output from the commutation timing signal detector 25 and DC voltage obtained thereby is compared by the comparator 39 with the reference voltage depending on the rotation frequency of the motor 1. Depending on the result of comparison, switching occurs by means of a switch 42 between the first oscillator 40 and the second oscillator 41. Outputs of these oscillators 40, 41 are alternately applied in the form of reference triangular waves to the triangular wave comparator 37 and the reference triangular wave generated from the second oscillator 41 presents an oscillation frequency differing from that of the reference triangular wave generated from the first oscillator 40. Preferably, the first oscillator 40 has an oscillation frequency of 15 kHz, on one hand, and the F/V converter 38 and the comparator 39 are so arranged that the switch 42 is connected to the first oscillator 40 for the rotation frequency less than 5000 and is connected to the second oscillator for the rotation frequency of 5000 or higher.

It is also possible to provide a signal oscillator and to switch oscillation frequency itself based on the output of the comparator.

As will be understood from the foregoing description, the second embodiment of the invention advantageously minimizes a switching loss of the inverter and effectively suppresses a heat generation from the inverter elements.

The third embodiment of the invention will be described with reference to FIGS. 9 through 11.

Figure 9:
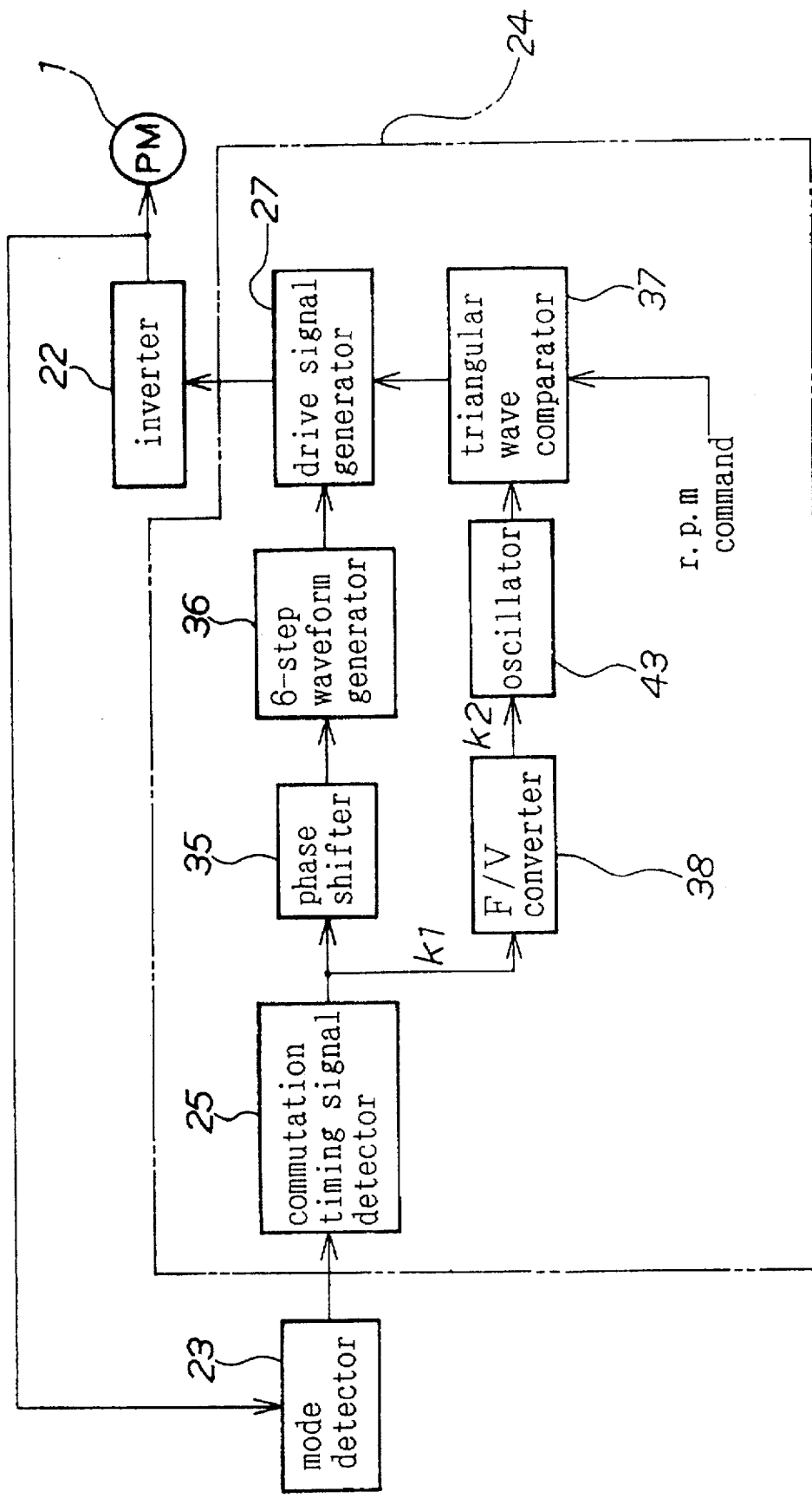
FIG. 9 is a block diagram of the control circuit in the third embodiment of the invention.

As seen in FIG. 9, a control circuit 24 in this embodiment principally comprises a commutation timing signal detector 25, a phase shifter 35, a 6-step waveform generator 36, a drive signal generator 27, a triangular wave comparator 37, an F/V converter 38 and an oscillator 43.

The commutation timing signal detector 25 detects the commutation timing obtained from a chop-off period based on the output of the mode detector 23 and generates a clock pulse. The phase shifter 35 is a delay circuit comprising a counter adapted to obtain a normal commutation timing based on the output signal of the commutation timing signal detector 25 and shifts (i.e., delays) the phase generally with an electrical angle of 15° to 30°. The 6-step waveform generator 36 generates waveforms of six modes based on the clock pulses applied from the phase shifter 35 so that the drive signal generator 27 may thereupon generate the motor drive signal and superpose this on the chopper signal applied from the triangular wave comparator 37 prior to application to the inverter 22. The F/V converter 38 serves to F/V convert the clock pulses which are proportional to the rotation frequency of the motor 1 output from the commutation timing signal detector 25 and DC voltage obtained thereby is applied to the oscillator 43 which then generates reference triangular wave of a period being proportional to the DC voltage. The triangular wave with a rotation frequency command voltage and output a predetermined chopper signal to the drive signal generator 27.

Figure 10:
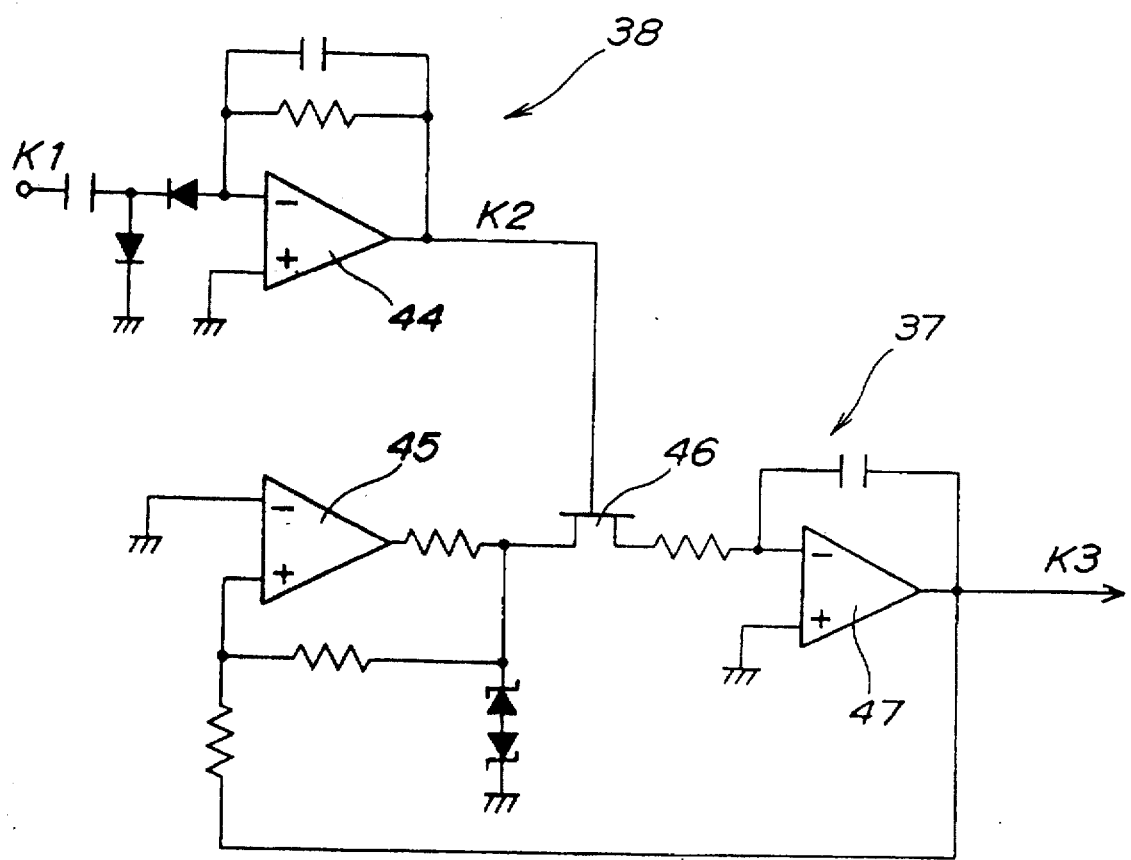
FIG. 10 is a circuit diagram showing a connection from an F/V converter to an oscillator.
Figure 11:
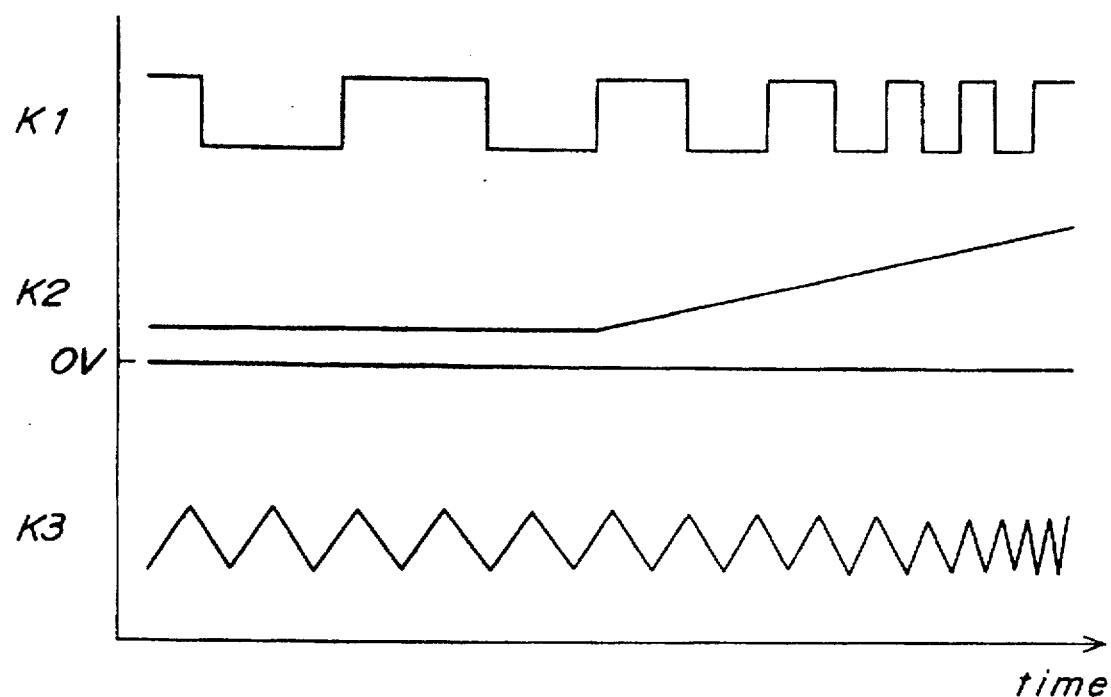
FIG. 11 is a waveform diagram illustrating predominant waveforms appearing in the F/V converter and the oscillator, respectively.

FIG. 10 exemplary illustrates a connection extending from the F/V converter 38 to the oscillator 43 shown in FIG. 9, and FIG. 11 illustrates waveforms generated from important components of the connection. The F/V converter 38 principally comprises an operational amplifier 44, a diode, a resistor and a capacitor. The commutation timing signal detector 25 generates six pulses per one revolution of the motor 1. When a signal k1 from the commutation timing signal detector 25 is applied to the F/V converter 38, DC voltage k2 which is proportional to the rotation frequency is obtained. The DC voltage k2 drives a gate of FET 46 and causes ON resistance of FET 46 to vary in a linear fashion. The triangular wave generator 37 comprises operational amplifiers 45, 47, oscillation frequency regulating resistors, a capacitor and a Zener diode. An FET is connected between the resistors so that an output signal k3 from the operational amplifier 47 presents a reference triangular wave of a frequency which is proportional to the frequency of the signal k1 output from the commutation timing signal detector 25. It should be understood that the time axis given in FIG. 11 for the respective waveforms k1, k2 and k3 is actually expanded relative to the waveform k3 for convenience of illustration.

In this embodiment, the rotation frequency is continuously variable from 2 kHz to 15 kHz for the rotation frequency of 0 to 10000 per minute.

As will be appreciated from the foregoing description, the third embodiment of the invention advantageously minimizes a switching loss of the inverter and suppresses a heat generation from the inverter elements, since the chopper frequency can be continuously varied in accordance with the rotation frequency of the motor 1.

Figure 12:
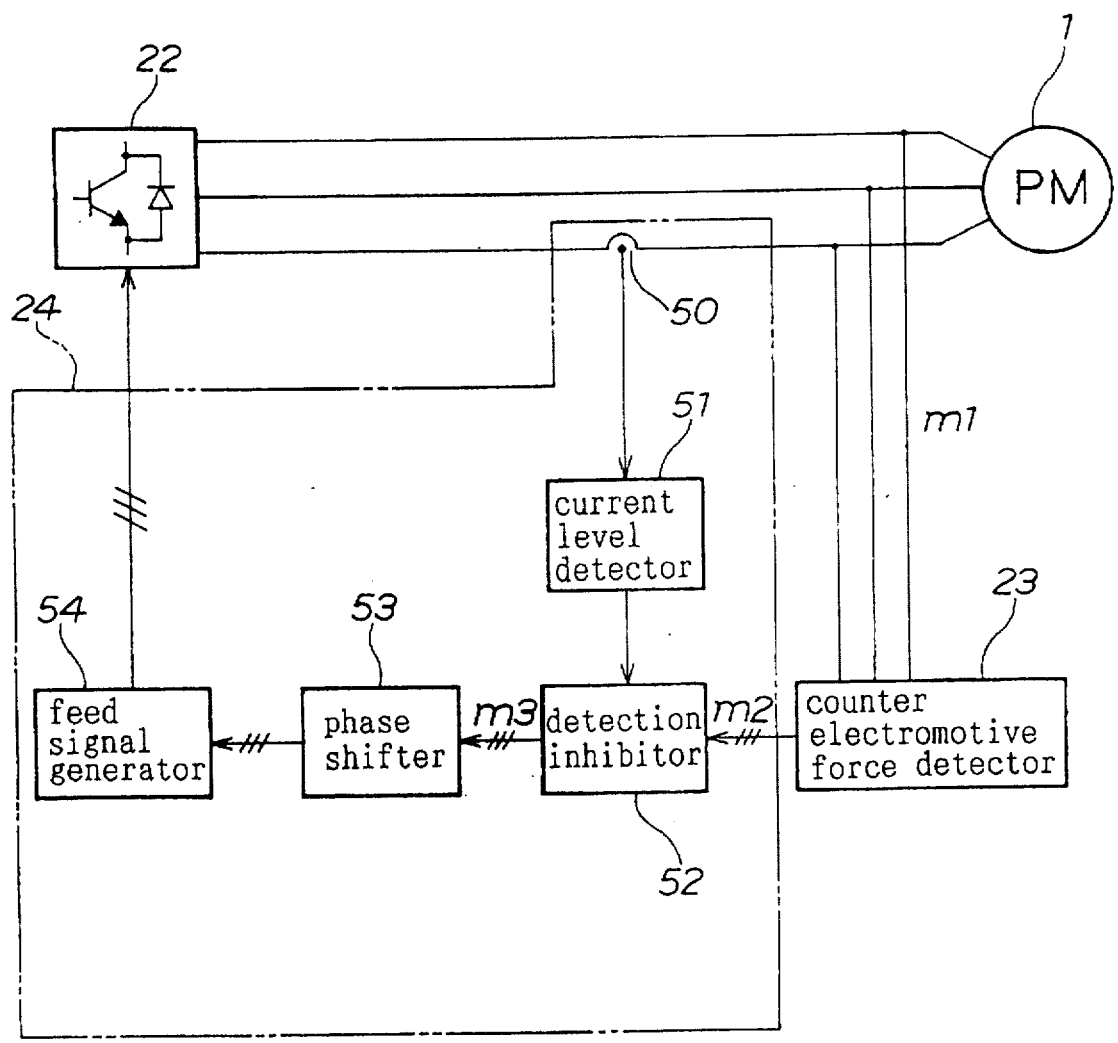
FIG. 12 is a block diagram of the control circuit in the fourth embodiment of the invention.

The fifth embodiment of the invention will be described with reference to FIGS. 12 through 17. Referring to FIG. 12, reference numeral 22 designates an inverter and reference numeral 23 designates a counter electromotive force detector (having a function similar to that of the mode detector in the previous first through fourth embodiments). The inverter 22 serves as a driver circuit for the brushless DC motor 1. The brushless DC motor 1 includes stator coils U, V, W and permanent magnet rotor 3 so that the permanent magnet rotor 3 is rotated under the effect of the magnetic field generated by current flowing through the stator coils.

A control circuit 24 according to this embodiment comprises a current detector 50, a current level detector 51, a detection inhibitor 52, a phase shifter 53 and a feed signal generator 54. Terminal voltage of the brushless DC motor 1 is applied to the counter electromotive force detector 23 and the counter electromotive force of the open phases is detected based on the terminal voltage. The current detector 50 and the current level detector 51 constitute together means to detect a magnitude of the current flowing through the motor 1. The current detector 50 employs components such as a shunt resistor and a current transformer to achieve the desired detection. The current level detector 51 is readily arranged by using a peak hold circuit. The detection inhibitor 52 is a circuit to inhibit further detection of the counter electromotive force immediately after commutation has occurred. The phase shifter 53 delays the phase of output signal from the detection inhibitor 52 by an electrical angle of 30°. The feed signal generator 54 is a circuit to generate a signal with which the inverter 22 is driven.

Figure 13:
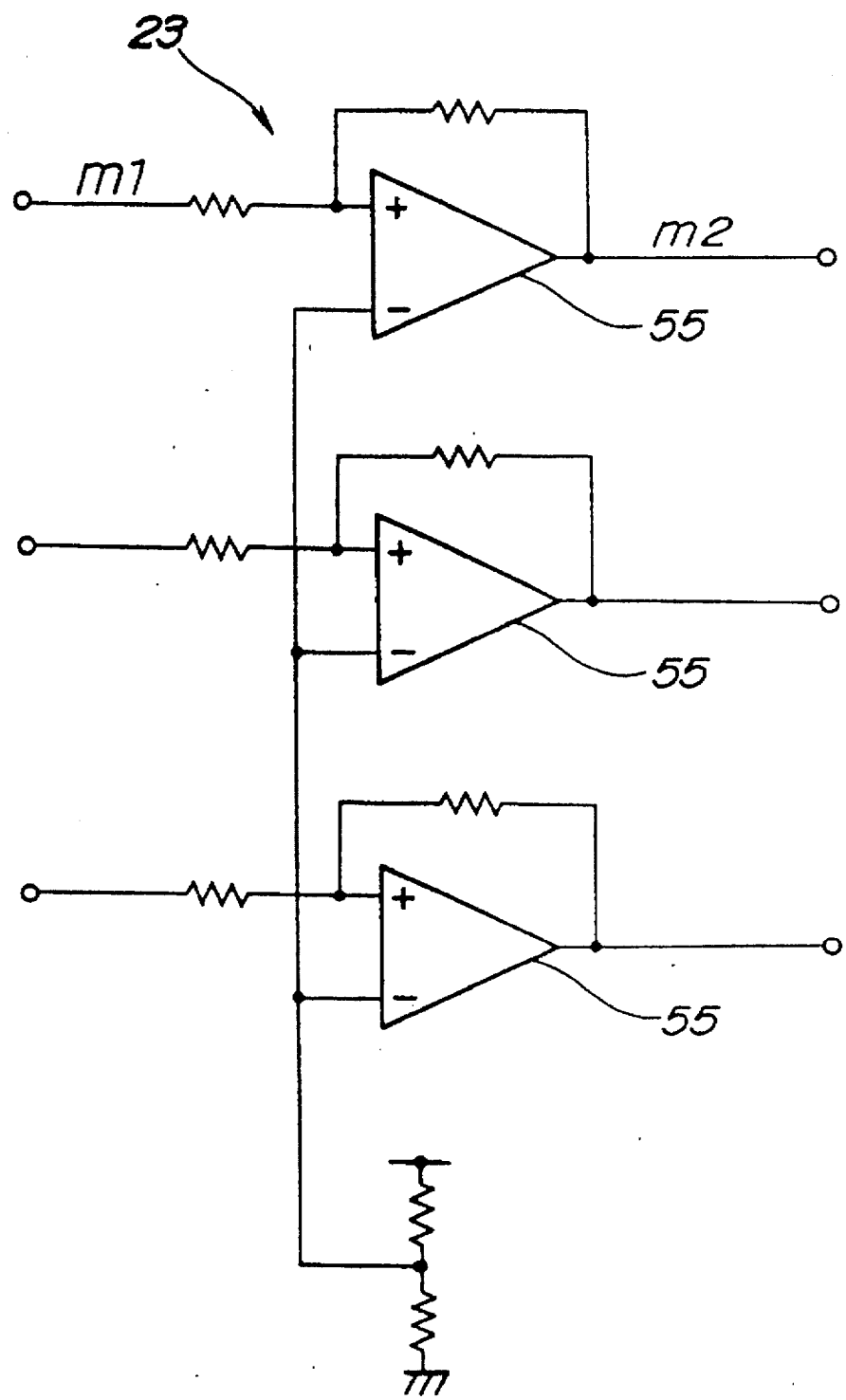
FIG. 13 is a circuit diagram of a counter electromotive force detector.
Figure 14:
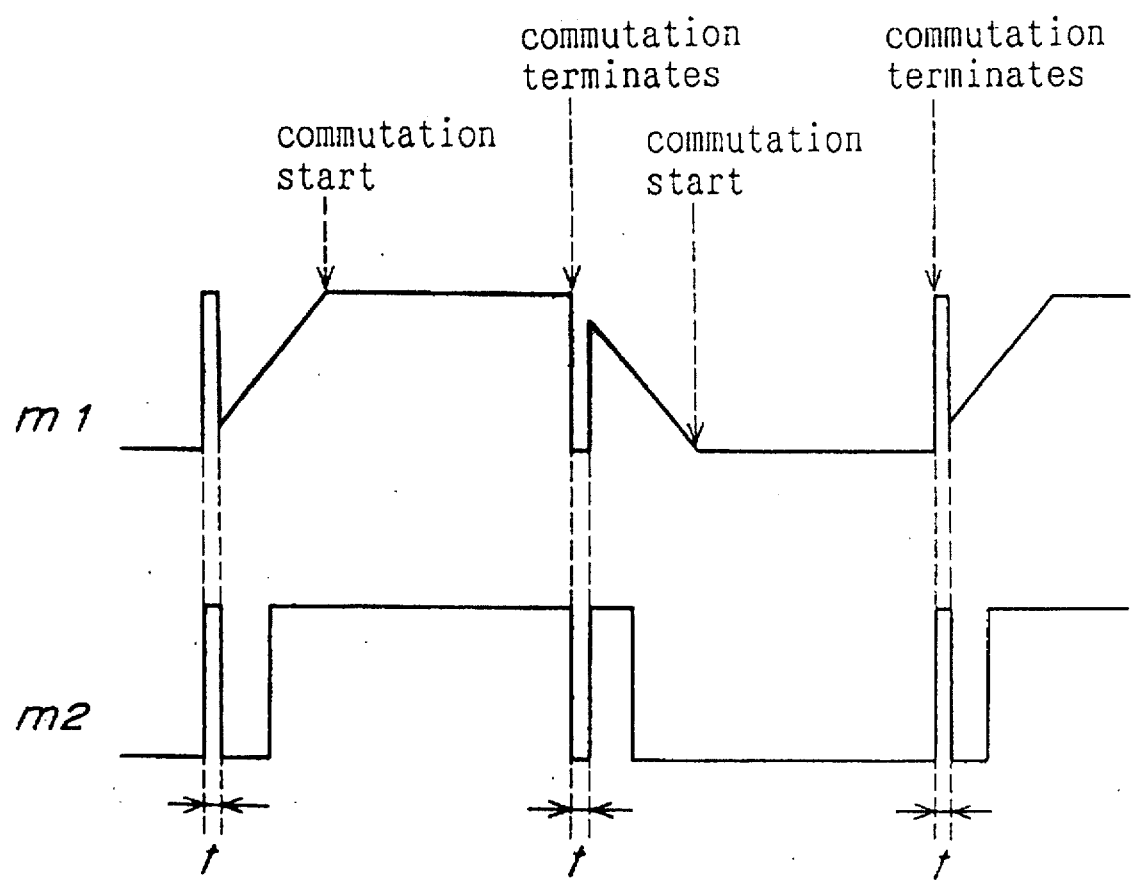
FIG. 14 is a signal waveform diagram for the counter electromotive force detector.
Figure 15:
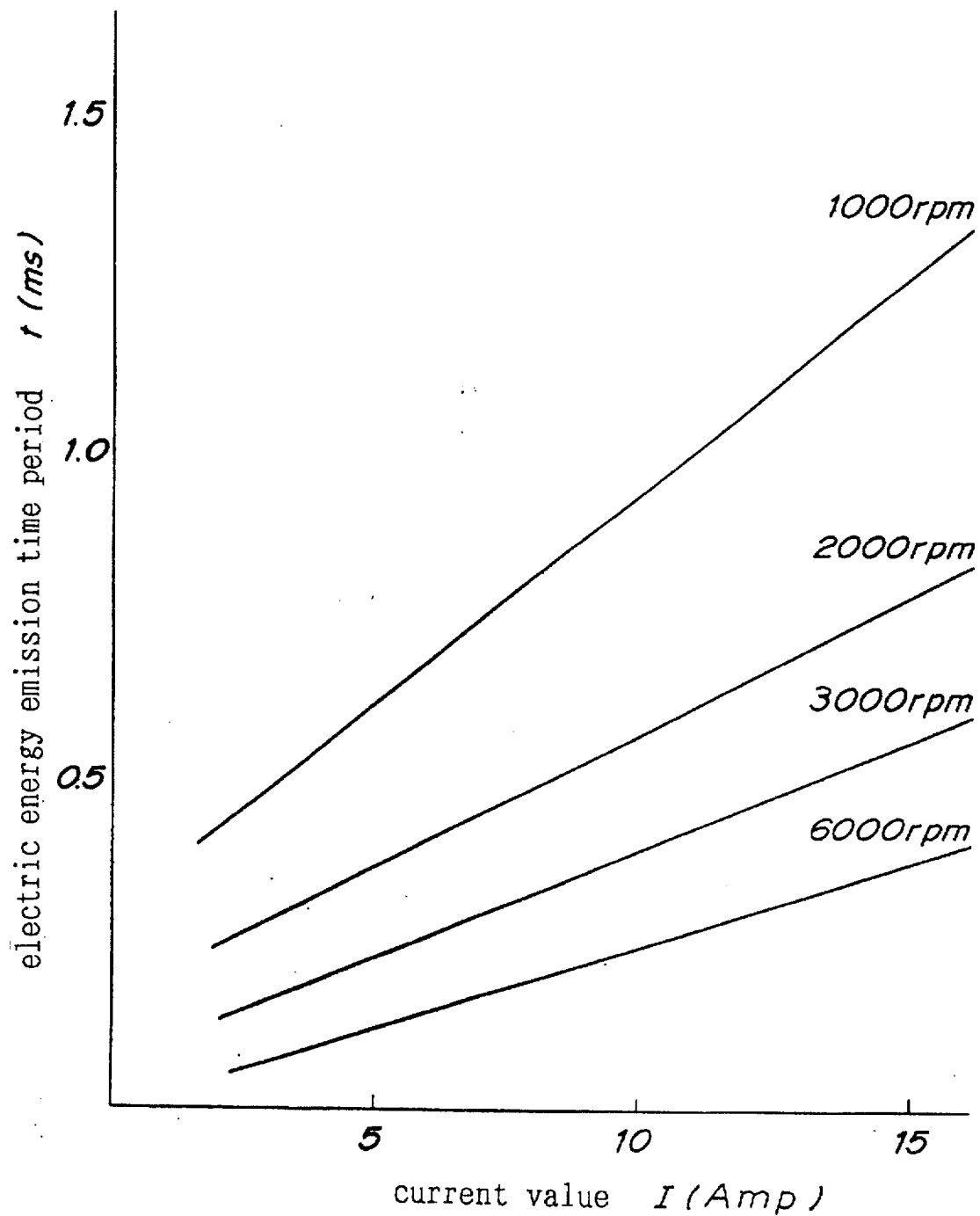
FIG. 15 is a graphic diagram illustrating a relationship between current value and electric energy emission time period.

Referring to FIG. 13, the counter electromotive force detector 23 uses a plurality of comparators 55 to compare a middle point with a terminal voltage of the motor 1 so that the terminal voltage m1 of the brushless DC motor 1 and the output m2 of the counter electromotive force detector 23 present waveforms as illustrated in FIG. 14, respectively. Referring to FIG. 14, a time period t for which an electric energy is emitted depends on the load and the rotation frequency. A current value I and the electric energy emission time period t are graphically shown in FIG. 15 based on the data experimentally obtained using the rotation frequency as a parameter. As will be apparent from FIG. 15, the electric energy emission time period t is prolonged as the rotation frequency is reduced. Accordingly, the controller should inhibit the detection of counter electromotive force for a time period longer than the time period corresponding to the expected minimum rotation frequency. However, this inhibiting time period exceeding an electrical angle of 30° would result in inhibiting the detection of counter electromotive force which must be detected.

Figure 16:
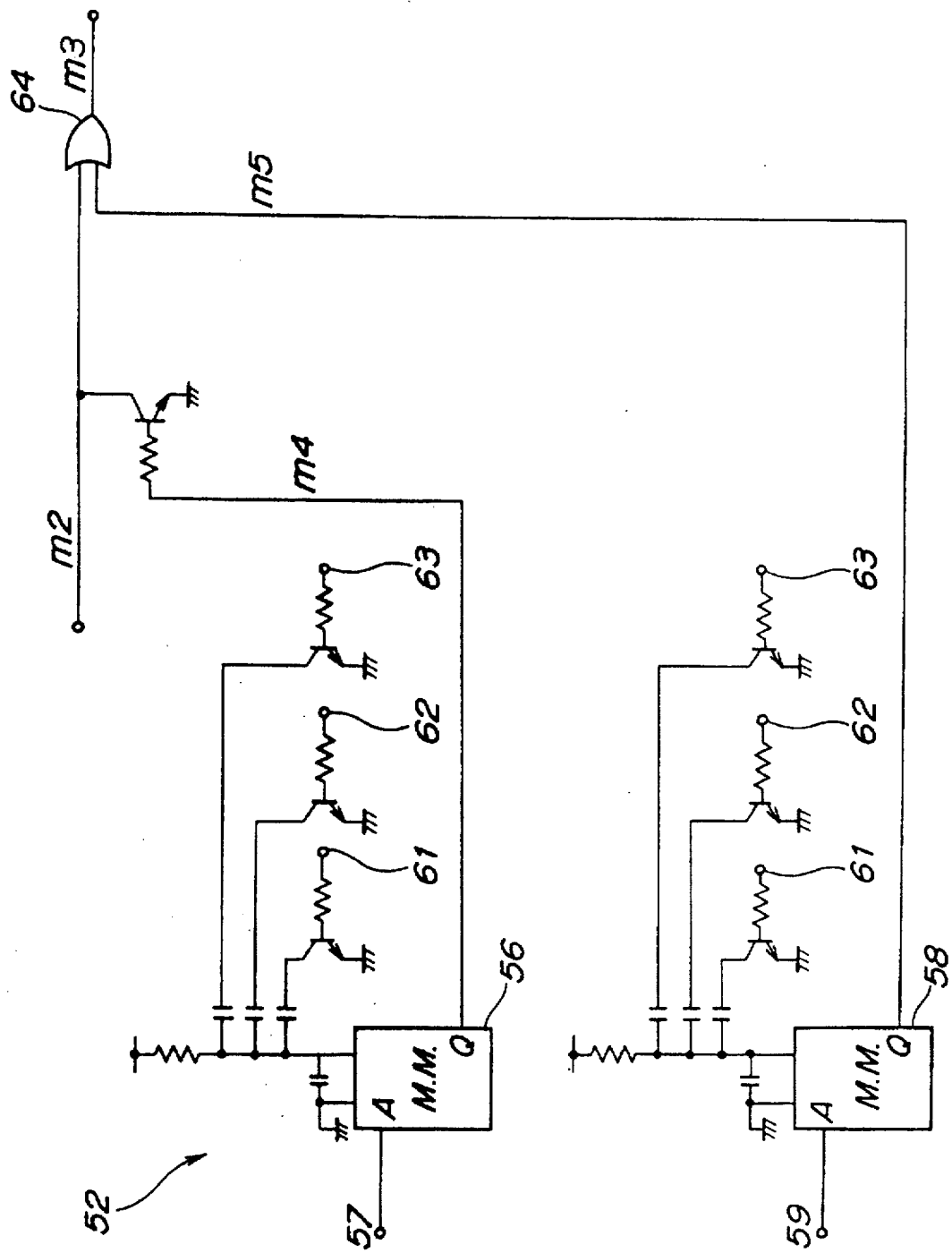
FIG. 16 is a circuit diagram of a detection inhibitor.
Figure 17:
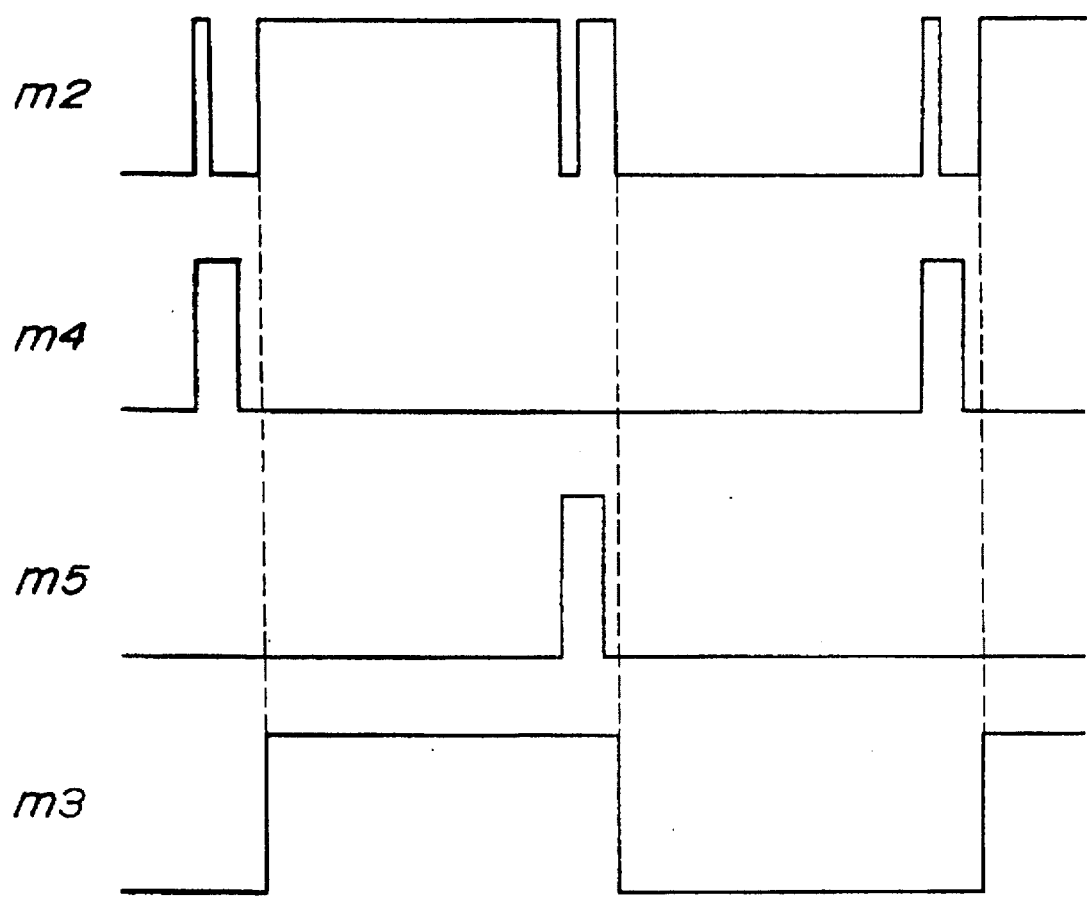
FIG. 17 is a signal waveform diagram for the detection inhibitor.

FIG. 16 exemplary shows the detection inhibitor 52. A feed termination signal for a lower armature is applied to an input terminal 57 of a monostable multivibrator 56 (hereinafter simply referred to as monomulti) while a feed termination signal for an upper armature is applied to an input terminal 59 of a monomulti 58. The output signal of the current level detector 51 is applied to terminals 61, 62, 63 of the respective monomultis 56, 58 and thereby varying a period of the output pulses. In this specific example, the period of the output pulses is varied by ON/OFF of timing capacitors. The signals appearing in the circuit of FIG. 16 present respective waveforms as illustrated in FIG. 17. Referring to FIG. 17, if m4 is at a high level, m2 is grounded and therefore no signal is transferred. If m5 is at a high level, output of an OR gate 64 is also at a high level. Thus, m4 and m5 may be arranged as illustrated in FIG. 17 to inhibit the detection as long as the electric energy is being emitted. m3 is an output waveform of the detection inhibitor 52. It should be understood that there must be provided the circuit of FIG. 16 by the number corresponding to the number of motor's phases. The signal presenting the waveform m3 leads the normal feed timing by an electrical angle 30° and therefore the phase shifter 53 must provide a delay corresponding to this electrical angle of 30°. The phase shifter 53 is readily implemented using a counter. Based on an output signal of the phase shifter 53, the feed signal generator 54 generates a drive signal for the inverter 22. Sometimes, the phase shifter 53 is eliminated depending on the particular manner in which the angle of lead is controlled.

As will be appreciated from the foregoing description, the fourth embodiment of the invention allows the position-sensorless drive to be achieved on the basis of the precise commutation timing even if the load and/or the rotation frequency fluctuate. Accordingly, the position-sensorless drive can be adopted for the particular field of application in which such a position-sensorless drive has usually been unpractical.

The fifth embodiment of the invention will be described with reference to FIGS. 18 and 19.

Figure 18:
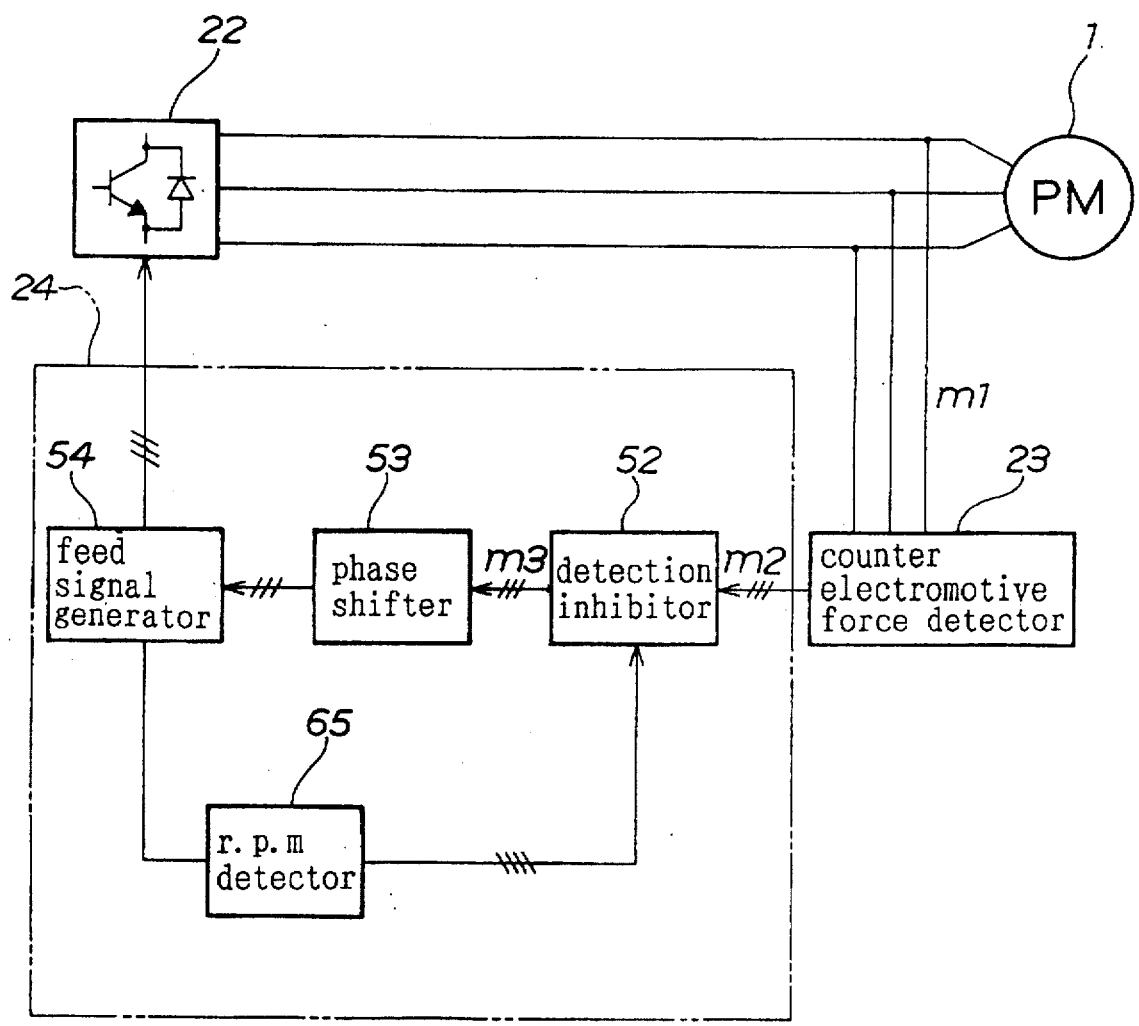
FIG. 18 is a block diagram of the control circuit in the fifth embodiment of the invention.
Figure 19:
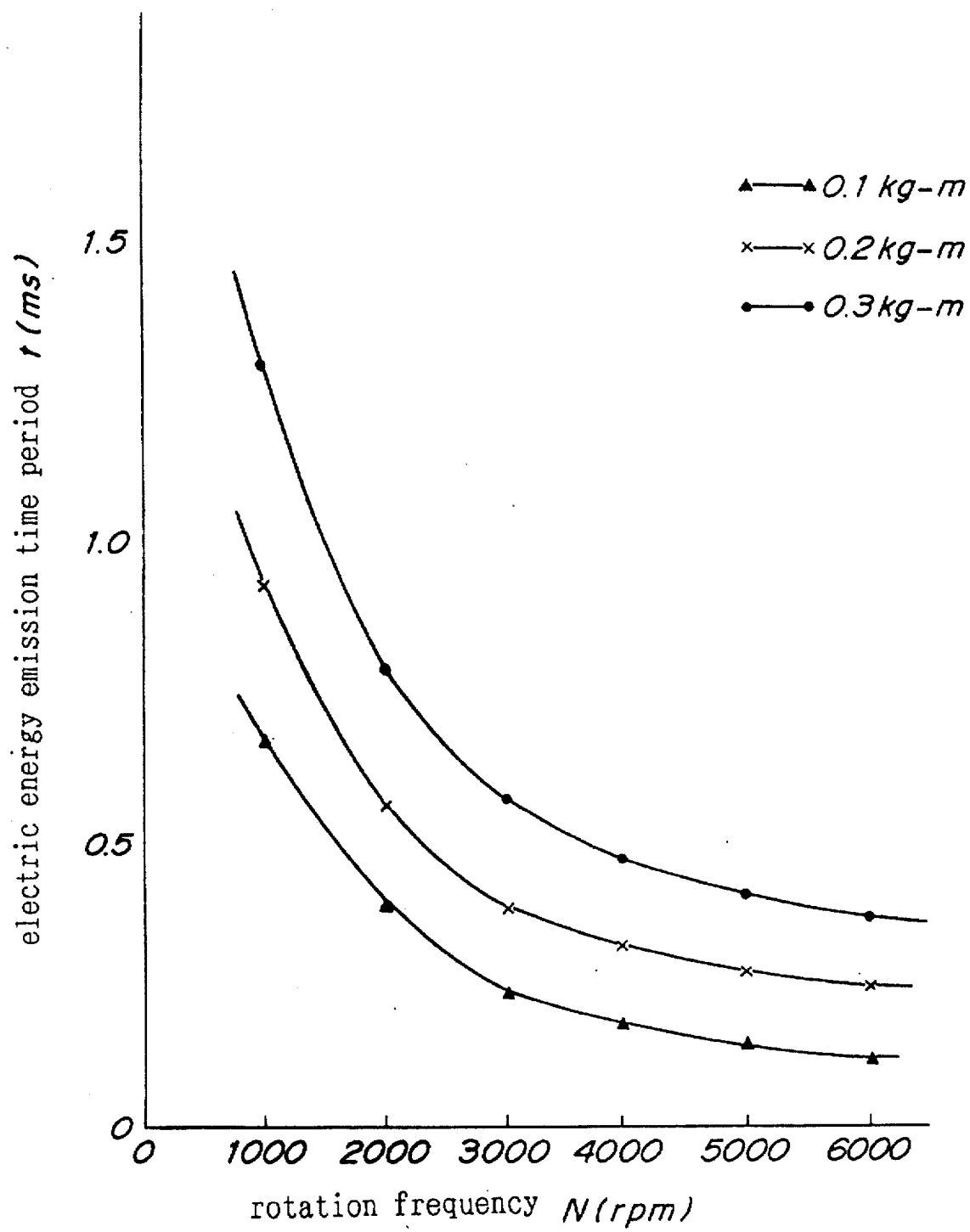
FIG. 19 is a graphic diagram illustrating a relationship between rotation frequency and electric energy emission time period.

A control circuit 24 according to this embodiment comprises, as shown in FIG. 18, a detection inhibitor 52, a phase shifter 53, a feed signal generator 54 and a rotation frequency detector 65.

The detection inhibitor 52 inhibits further detection of counter electromotive force immediately after the commutation has occurred. The phase shifter 53 delays the phase of output signal from the detection inhibitor 52 by an electrical angle of 30°. The feed signal generator 54 serves to generate a signal with which the inverter 22 is driven. The rotation frequency detector 65 detects the rotation frequency of the motor 1 and the rotation frequency information provided therefrom is applied to the detection inhibitor 52.

A counter electromotive force detector (=mode detector) 23 is of the arrangement similar to that in the previous fifth embodiment and provides the output waveform m2 as illustrated in FIG. 14. The rotation frequency N and the electric energy emission time period t are graphically shown in FIG. 19 based on the data experimentally obtained using the load as a parameter. As will be apparent from FIG. 19, the electric energy emission time period t is prolonged as the rotation frequency is reduced. Accordingly, in this embodiment also, the controller should inhibit the detection of counter electromotive force for a time period longer than the time period corresponding to the expected minimum rotation frequency. However, this inhibiting time period exceeding an electrical angle of 30° would result in inhibiting the detection of the counter electromotive force which must be detected.

The detection inhibitor 52 is of the arrangement similar to that in the previous fifth embodiment shown in FIG. 16 and provides the output waveform as illustrated in FIG. 17. The output signal leads the normal feed timing by an electrical angle of 30° and therefore the phase shifter 53 must provide a delay corresponding to the electrical angle of 30°. In response to the phase shifter 53, the feed signal generator 54 generates a drive signal for the inverter 22.

As will be appreciated from the foregoing description, the fifth embodiment of the invention also allows the position-sensorless drive to be achieved on the basis of the precise commutation timing even if the load and the rotation frequency fluctuate. Accordingly, the position-sensorless drive can be adopted for the particular field of application in which such a position-sensorless drive has usually been unpractical. While the fifth and sixth embodiments of the invention have been described above as employing the counter electromotive force detection according to so-called middle point comparison, it should be understood that these embodiments are also applicable to the case in which the counter electromotive force is detected based on the turned-on states of the feedback diodes as previously mentioned.

Figure 20:
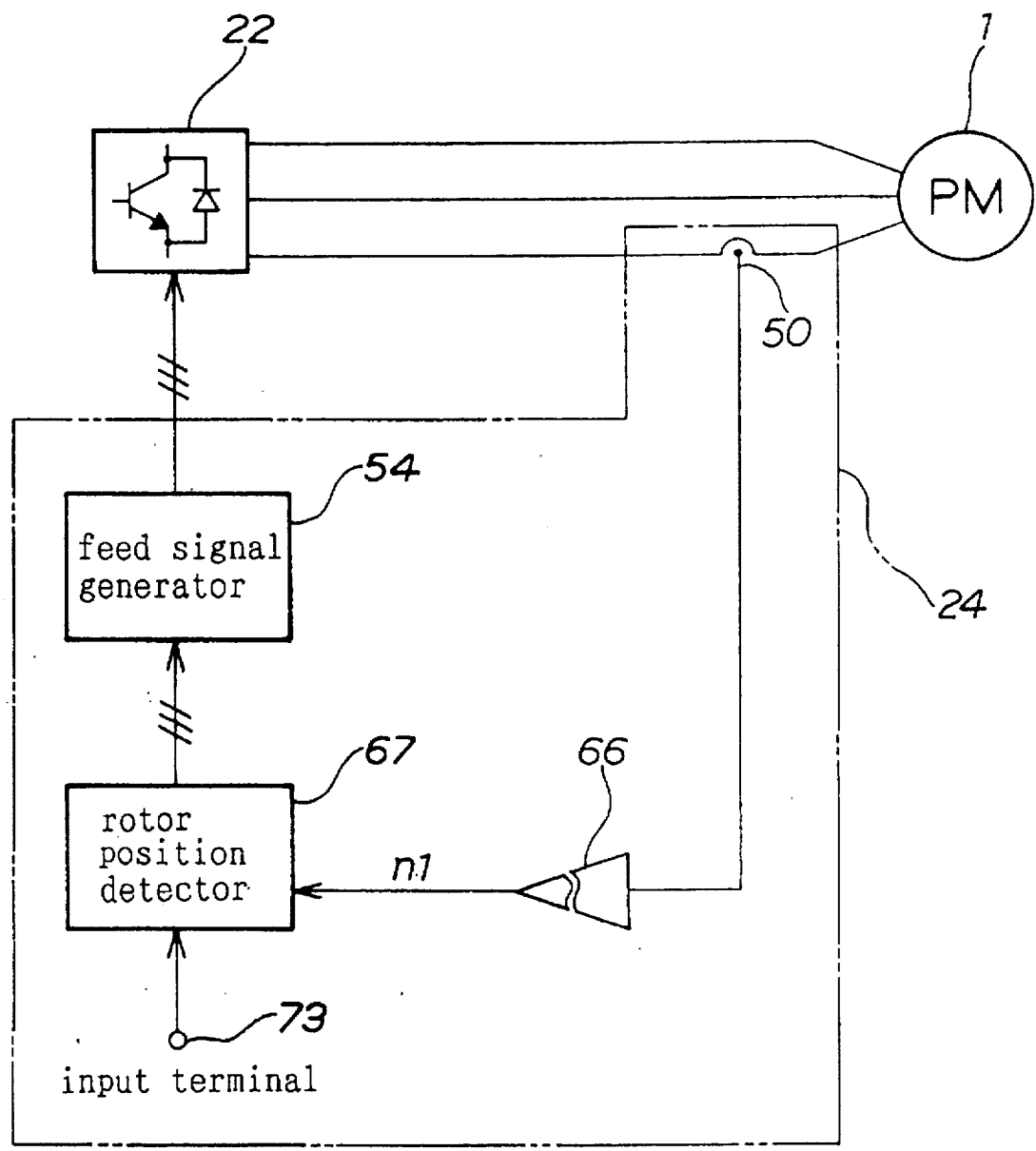
FIG. 20 is a block diagram of the control circuit in the sixth embodiment of the invention.

Finally, the sixth embodiment of the invention will be described with reference to FIGS. 20 through 25, taking the case in which a three-phase DC brushless motor is used. FIG. 20 is a block diagram generally showing an arrangement of this embodiment.

Figure 21:
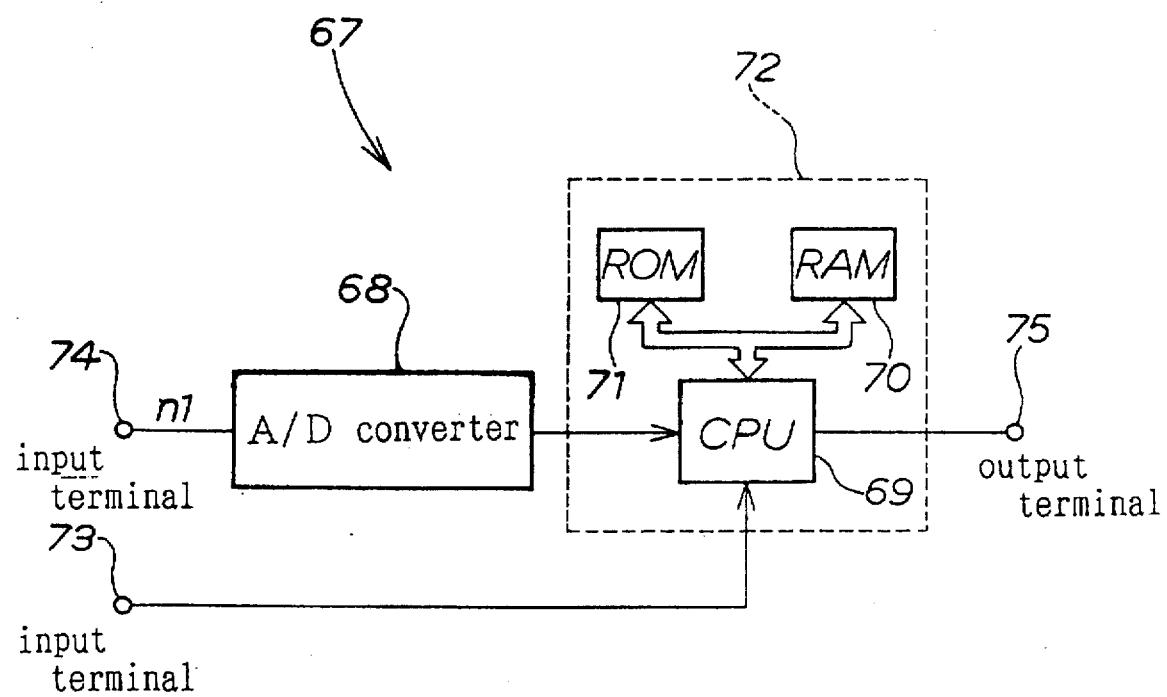
FIG. 21 is a block diagram of a rotor position detector.

A controller 24 according to this embodiment comprises a current detector 50, an isolation amplifier 66, a rotor position detector 67 and a feed signal generator 54. The current detector 50 serves to detect a waveform of current flowing through the DC motor using components such as a shunt resistor and a current transformer. The feed signal generator 54 generates a signal with which the inverter 22 is driven. The isolation amplifier 66 and the rotor position detector 67 constitute together means to detect the current waveform and thereby detecting the position of the permanent magnet rotor 3. The rotor position detector 67 is of an arrangement as shown in FIG. 21.

Output n1 of the isolation amplifier 66 is applied to an A/D converter 68 which samples the current waveform of a given period and digitizes this. The current waveform thus digitized is applied to a microcomputer 72 comprising a CPU 69, a RAM 70 and a ROM 71 and, the microcomputer 72 diagnoses the waveform. A start signal also is applied to an input terminal 73 of the microcomputer 72.

Figure 22:
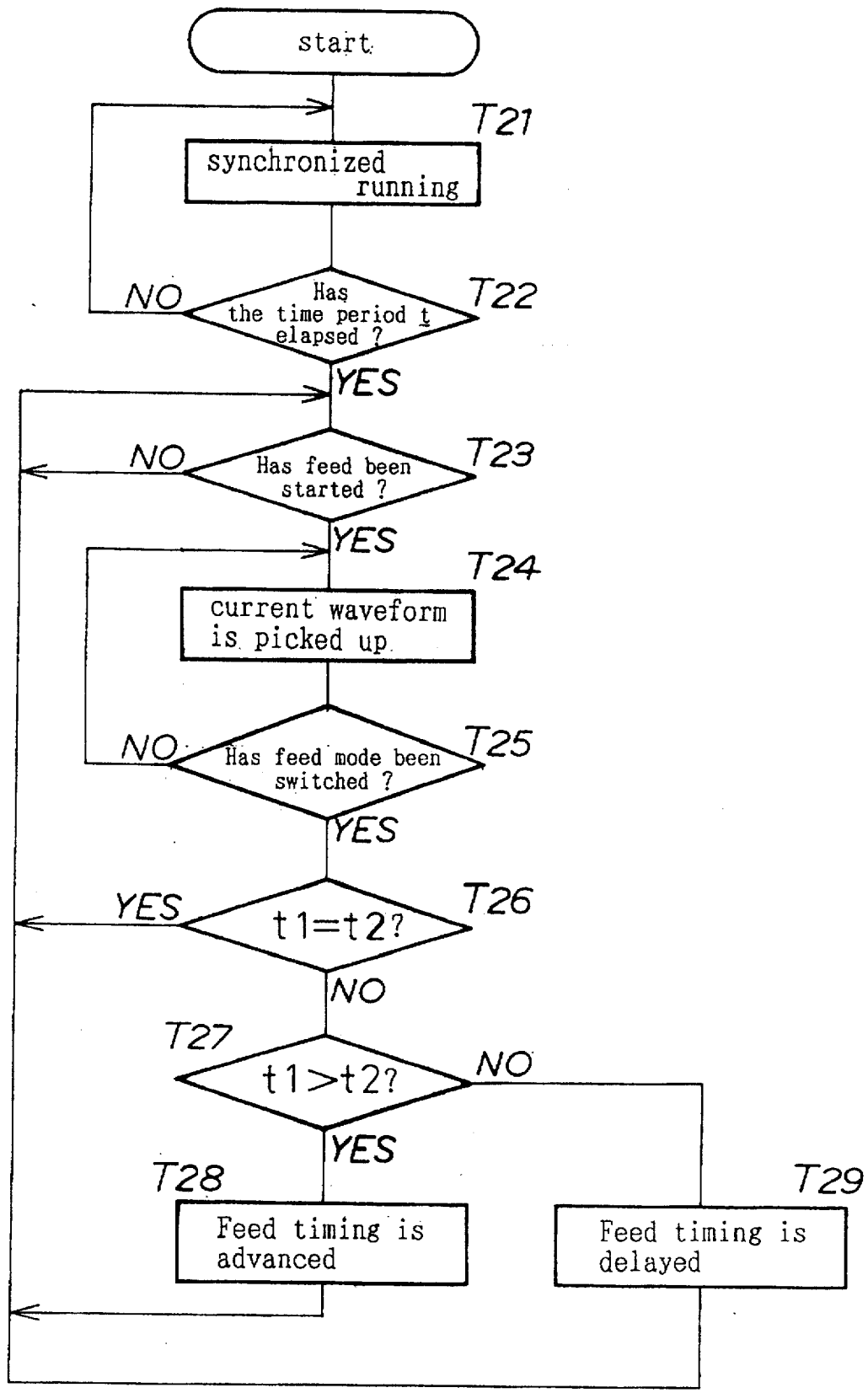
FIG. 22 is a flow chart of rotor position detection.

Now, operation of the controller as has been described above will be described with reference to the flow chart of FIG. 22.

Upon application of the start signal, the microcomputer 72 generates a signal of a given period from its output terminal 75 and this signal is applied to the feed signal generator 54, causing a synchronized running of the brushless DC motor 1 (step T21). The synchronized running continues for a given time period t until the brushless DC motor 1 reaches a predetermined rotation frequency (step T22). The given time period t depends on the characteristics of the brushless DC motor actually used.

After the brushless DC motor has continued the synchronized running for the predetermined time period t at the step T22, the microcomputer 72 determines at a step T23 whether a feed (commutation) to the phase in which the current waveform is being detected is started or not. If the determination is affirmative, the current waveform output from the A/D converter 68 is picked up and stored in the RAM 70 (step T24) until the feed mode is switched (step T25). If the feed mode has been switched at the step T25, the CPU 69 reads the current waveform stored in the RAM 70 and thereby detecting the peak position of the current waveform (step T26, step T27) to detect the position of the magnetic poles of the rotor.

Figure 23:
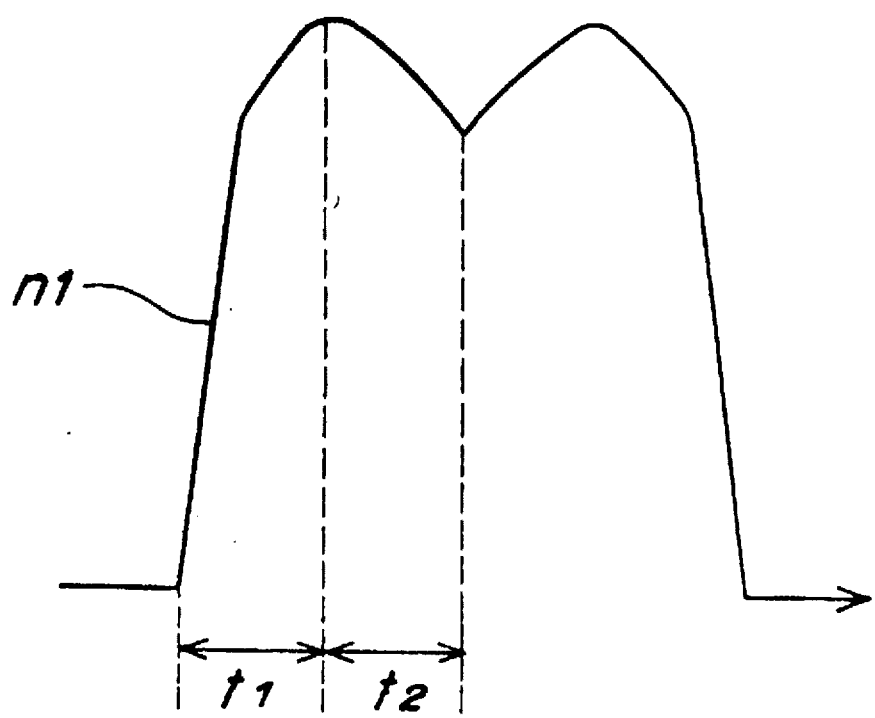
FIGS. 23, 24 and 25 are waveform diagrams illustrating current waveforms as function of feed timing, respectively.
Figure 24:
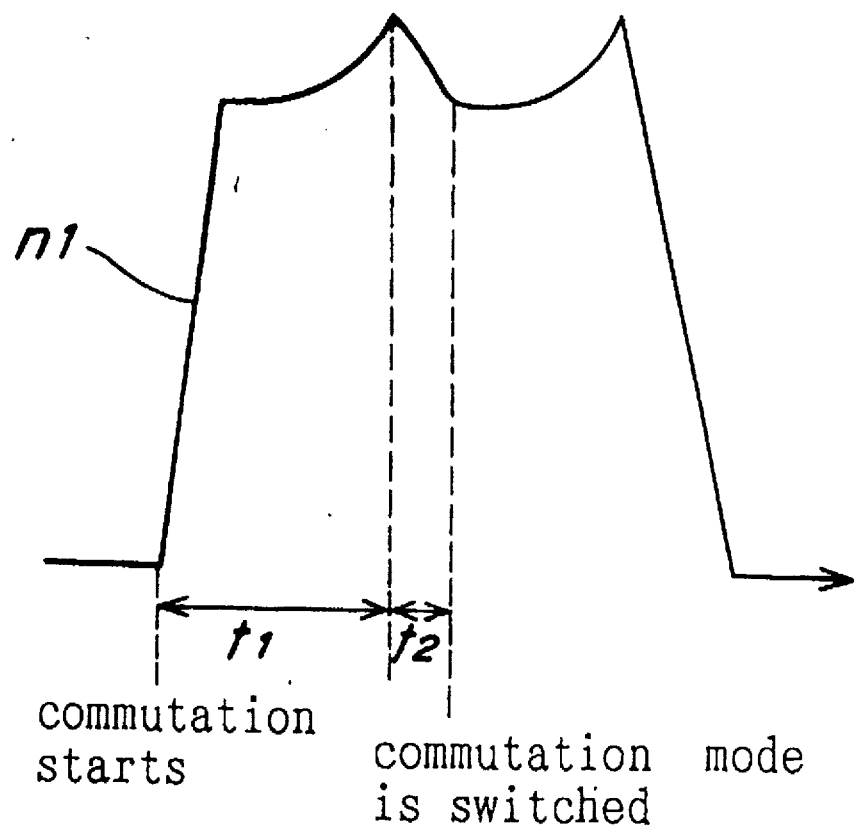
Figure 25:
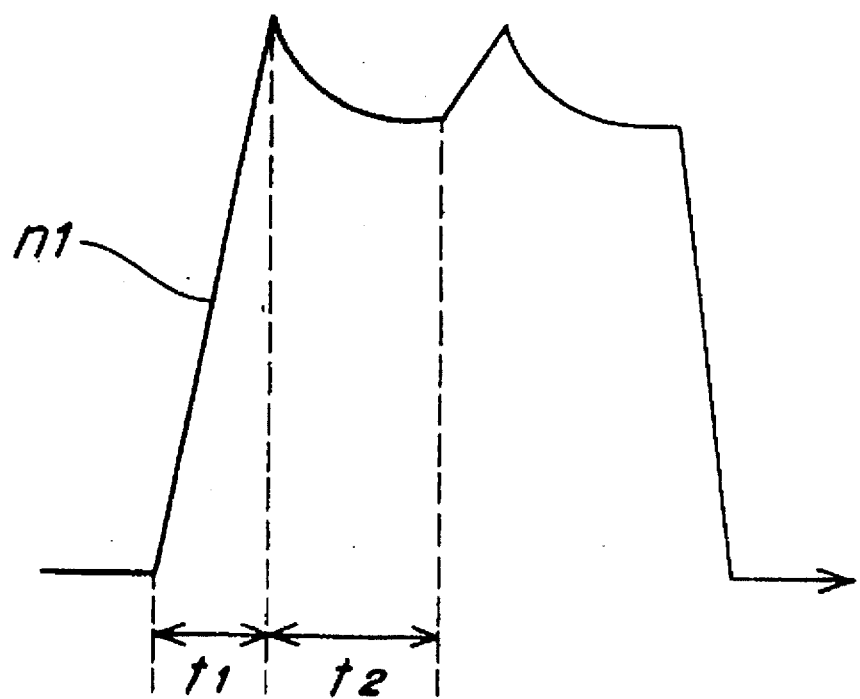
Figure 26:
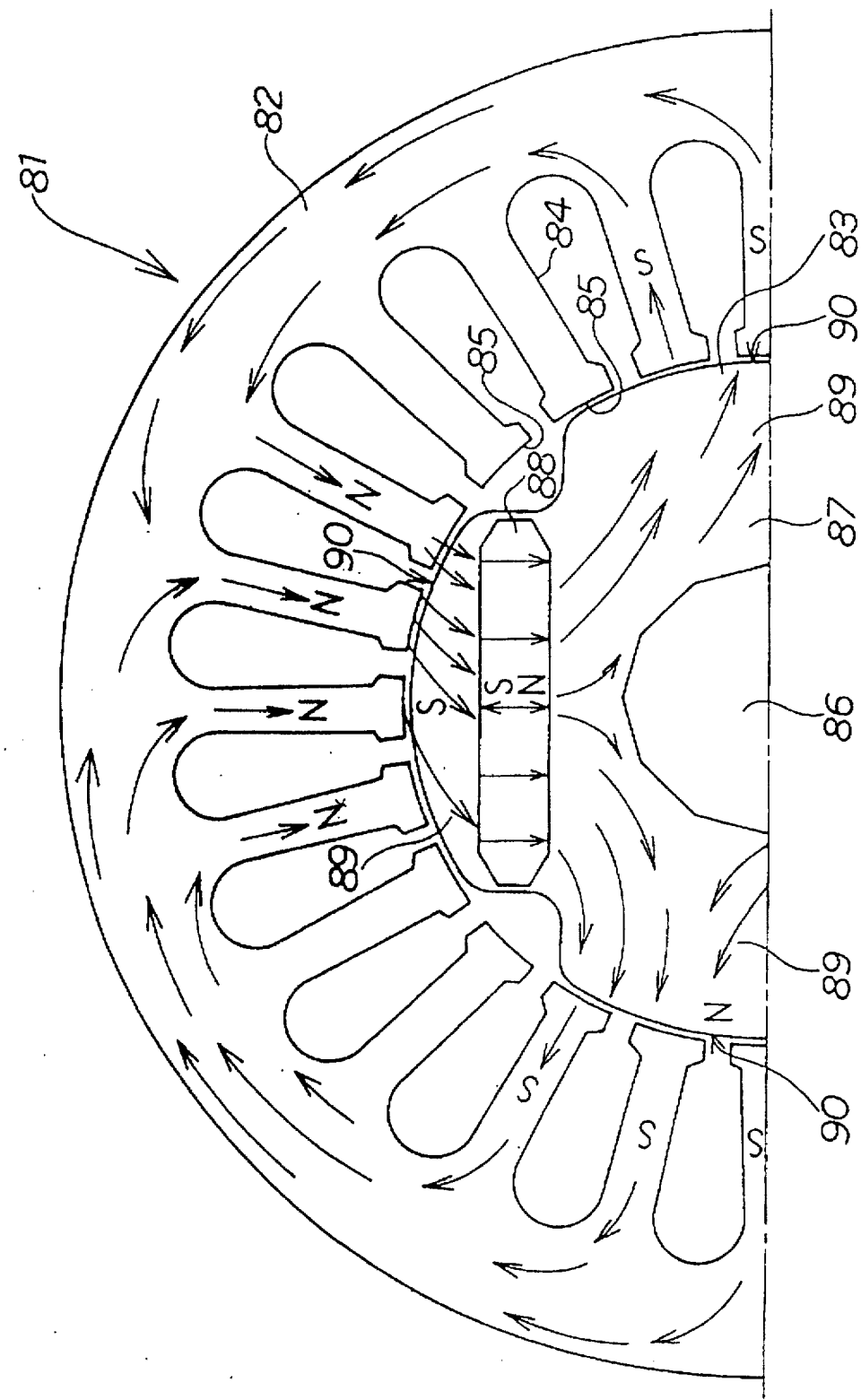
FIG. 26 is a sectional view showing a brushless DC motor without position sensor of prior art as halved.
Figure 27:
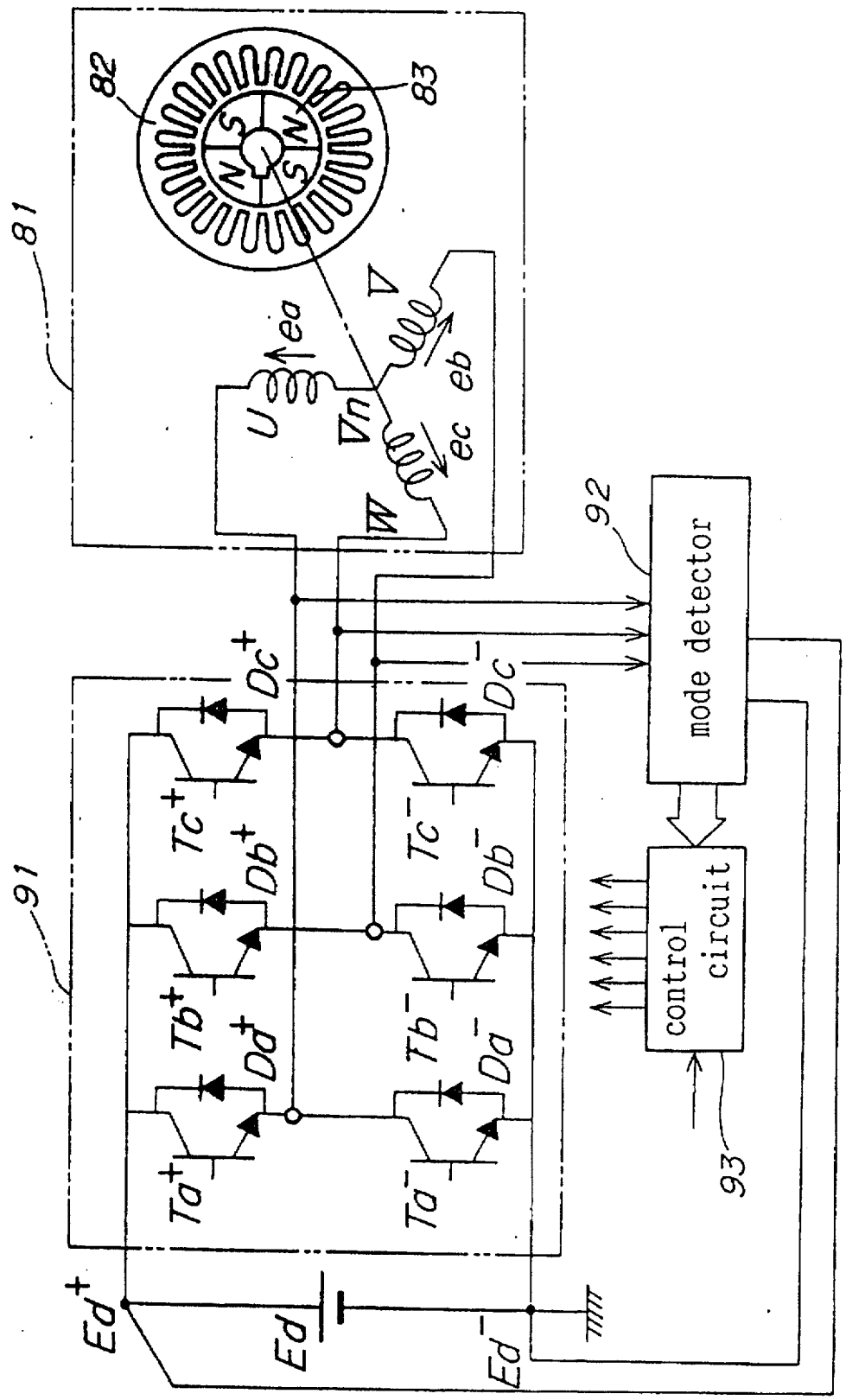
FIG. 27 is a circuit diagram of an inverter used in a motor of prior art.
Figure 28:
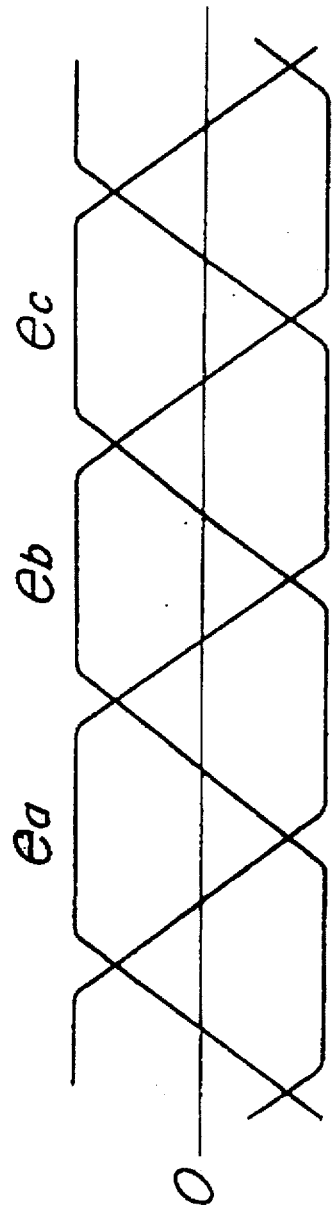
FIG. 28 is a diagram illustrating a relationship between counter electromotive force and driving signal in a motor of prior art.
Figure 29:
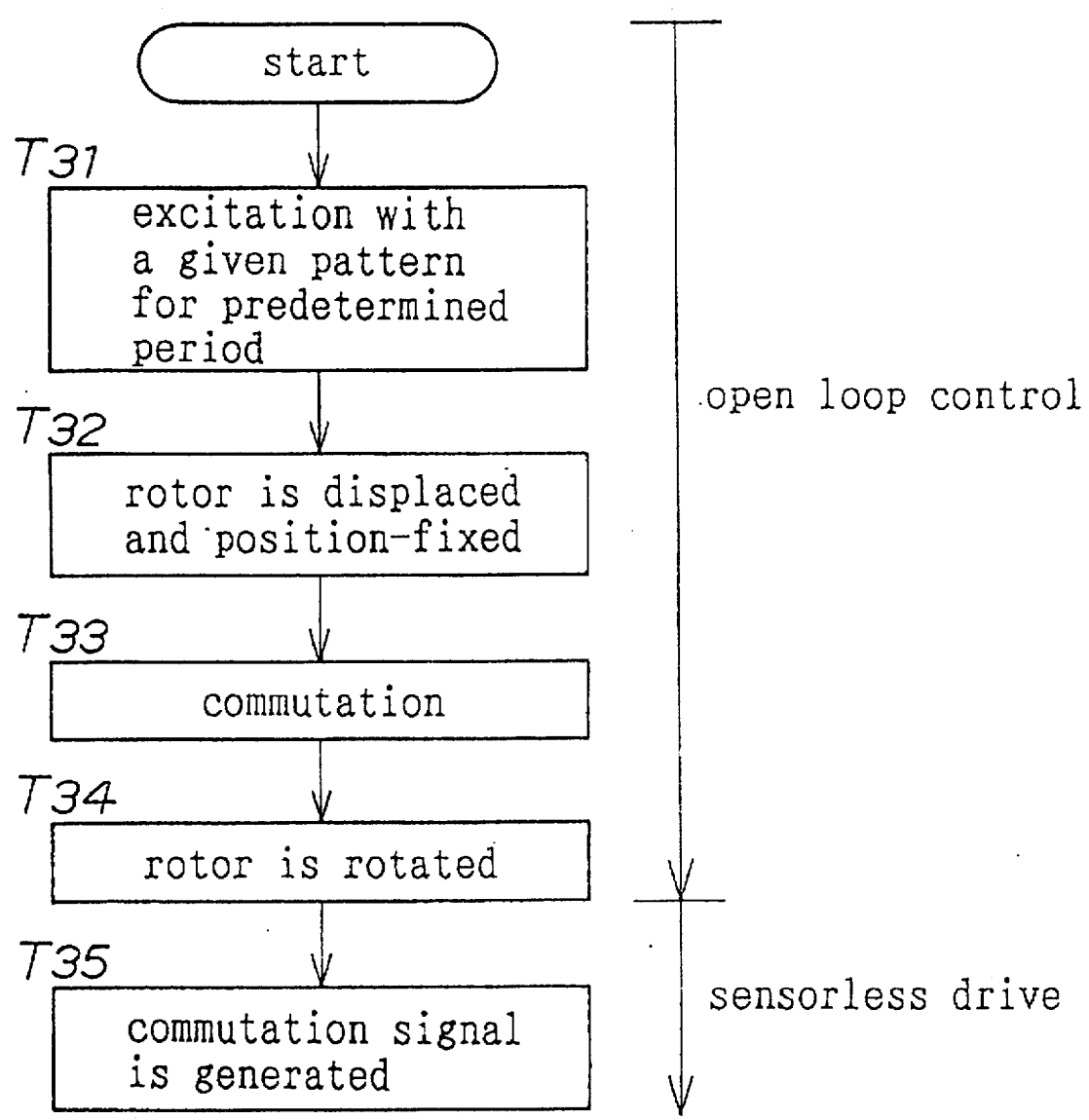
FIG. 29 is a flow chart illustrating a starting sequence for a motor of prior art.

If the current waveform has been detected, for example, to have the peak position lying on the middle ($t_1=t_2$) between the commutation starting point and the feed mode switching point as shown in FIG. 23, the present feed timing is determined to match the relative position of the rotor and the stator coils. If the peak position lies on the second half ($t_1>t_2$) as shown in FIG. 24, the feed timing is determined to be delayed. If the peak position lies on the first half ($t_1<t_2$) as shown in FIG. 25, the feed timing is determined to be advanced.

When $t_1=t_2$, the feed is continued with this timing, and when $t_1>t_2$, the feed timing is advanced by a prescribed amount (step T28). When $t_1<t_2$, the feed timing is delayed by a prescribed amount (step T29).

Once the feed timing has been changed, the next feeding is waited for and, upon starting of the feeding, the operation as mentioned above will be repeated. In this manner, the precise commutation timing can be achieved even the rotation frequency and/or the load fluctuate. However, excessively delaying or advancing the timing will result in repetition of $t_1>t_2$ and $t_1<t_2$.

As will be appreciated from the foregoing description, the sixth embodiment of the invention allows the stable position detection of the rotor even when the rotor structurally prevents the counter electromotive force in the open phases from linearly varying. Furthermore, the commutation can be achieved always with the precise timing because the feed timing is always monitored on the basis of the current waveform.

Industrial Usefulness

In spite of having no position-sensor, the brushless DC motor of the invention can precisely detect the rotor position, assure an adequate structural strength and achieve a fine rotation control. In view of these abilities, the brushless DC motor of the invention is suitable for use under a severe condition such as high temperature usually encountered by the scroll type compressor.

What is claimed is:

1. A controller for a brushless DC motor without a position sensor including an inverter for driving the motor under chopper control and utilizing a counter electromotive force generated in stator coils of respective phases as a rotor is rotated in order to detect a position of the rotor and thereby to generate a commutation signal, said controller comprising a mode detector connected to the inverter for detecting a commutation timing signal detector connected to said mode detector to generate a commutation timing signal, an output pattern mode generator connected to said commutation timing signal detector to generate output patterns of several types with which said stator coils are excited, a pattern coincidence detector connected to said commutation timing signal detector and said output pattern mode generator to detect a coincidence that signals output from said commutation timing signal detector and said output pattern mode generator match each other and a starting controller connected to said pattern coincidence detector to stop a motor drive output once when no coincidence is detected by said pattern coincidence detector and to cause a restarting.

2. A controller according to claim 1, wherein said pattern coincidence detector comprises an EX-OR gate connected to said output pattern mode generator and said commutation timing signal detector and a NAND gate connected to said EX-OR gate and said commutation timing signal detector to output a signal to said starting controller.

* * * * *